United States Patent
Mesde et al.

(10) Patent No.: US 12,250,274 B2
(45) Date of Patent: Mar. 11, 2025

(54) VEHICLE SIGNAL RELAY SERVICE

(71) Applicant: Amazon Technologies, Inc., Seattle, WA (US)

(72) Inventors: Roland Mesde, Cupertino, CA (US); Alex Bessonov, San Jose, CA (US); Brian Ewanchuk, Redmond, WA (US); George Sherif Kamal Hanna, Toronto (CA); Nitin Giri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/192,351

(22) Filed: Mar. 29, 2023

(65) Prior Publication Data

US 2024/0333802 A1    Oct. 3, 2024

(51) Int. Cl.
| | |
|---|---|
| *H04L 12/24* | (2006.01) |
| *H04L 12/40* | (2006.01) |
| *H04L 41/0803* | (2022.01) |
| *H04L 67/125* | (2022.01) |

(52) U.S. Cl.
CPC ............ *H04L 67/125* (2013.01); *H04L 12/40* (2013.01); *H04L 2012/40215* (2013.01); *H04L 2012/40273* (2013.01)

(58) Field of Classification Search
CPC .................. H04L 67/125; H04L 12/40; H04L 2012/40215; H04L 2012/40273
USPC .......................................................... 709/224
See application file for complete search history.

(56) References Cited

U.S. PATENT DOCUMENTS

| | | | |
|---|---|---|---|
| 7,782,826 B2 | 8/2010 | Olivier et al. | |
| 8,705,527 B1 * | 4/2014 | Addepalli | ............... H04L 1/008 370/389 |
| 8,719,782 B2 | 5/2014 | DeHaan | |
| 9,880,837 B2 | 1/2018 | Khazanchi et al. | |
| 11,314,495 B2 | 4/2022 | Francis | |
| 11,593,085 B1 * | 2/2023 | Khare | ....................... G06F 8/65 |

(Continued)

FOREIGN PATENT DOCUMENTS

CN        115675327 A        2/2023

OTHER PUBLICATIONS

Stefan Boschert, "Next Generation Digital Twin," Conference Paper May 2018, ResearchGate, in Proceedings of TMCE 2018, pp. 209-218.

(Continued)

*Primary Examiner* — El Hadji M Sall
*Assistant Examiner* — Elizabeth Kassa
(74) *Attorney, Agent, or Firm* — Alexander A. Knapp; Kowert, Hood, Munyon, Rankin & Goetzel, P.C.

(57) ABSTRACT

A vehicle signal relay system enables a relay agent in a first zone of a vehicle to send sensor signals having a first link-layer communication protocol to a software application deployed on a compute unit in another zone of the vehicle that is connected using another link-layer communication protocol. The vehicle signal relay system allows the software application to identify target relay agents with access to needed sensor signals. The vehicle signal relay system may further enable one way or mutual attestation. The vehicle signal relay system may also allow filters to be applied to the subscribed vehicle sensor signals, and may allow the software application to determine a communication protocol to be used between the software application and the relay agent.

20 Claims, 15 Drawing Sheets

(56) References Cited

U.S. PATENT DOCUMENTS

| | | | |
|---|---|---|---|
| 11,818,235 B1* | 11/2023 | Teshler | H04L 67/12 |
| 11,873,022 B2* | 1/2024 | Yamada | H04L 12/40 |
| 2006/0204037 A1* | 9/2006 | Watanabe | G06V 20/58 |
| | | | 701/1 |
| 2008/0109130 A1* | 5/2008 | Huang | G01R 31/007 |
| | | | 701/31.4 |
| 2010/0106356 A1* | 4/2010 | Trepagnier | G05D 1/0214 |
| | | | 701/25 |
| 2014/0005880 A1* | 1/2014 | Guenkova-Luy | H04L 67/12 |
| | | | 701/31.4 |
| 2014/0042939 A1* | 2/2014 | Kobayashi | H02P 27/08 |
| | | | 318/400.3 |
| 2015/0082289 A1* | 3/2015 | Leinfellner | G06F 11/3664 |
| | | | 717/134 |
| 2016/0325729 A1* | 11/2016 | Askerdal | B60W 10/30 |
| 2017/0072876 A1* | 3/2017 | Rajan | G06F 13/4282 |
| 2019/0250611 A1 | 8/2019 | Costin et al. | |
| 2019/0263279 A1* | 8/2019 | Kyojo | B60L 58/20 |
| 2019/0384870 A1 | 12/2019 | Shiraishi et al. | |
| 2019/0391800 A1* | 12/2019 | Lin | G06F 8/65 |
| 2020/0126324 A1* | 4/2020 | Hutchins | G07C 5/0808 |
| 2020/0267080 A1* | 8/2020 | Joshi | H04L 45/745 |
| 2020/0294401 A1 | 9/2020 | Kerecsen | |
| 2020/0412694 A1* | 12/2020 | Vanderveen | H04L 63/0263 |
| 2021/0269047 A1* | 9/2021 | Nakaya | H04L 67/12 |
| 2021/0273824 A1* | 9/2021 | Nakaya | H04L 12/40 |
| 2022/0078077 A1* | 3/2022 | Mifsud | G06F 9/45533 |
| 2022/0150317 A1* | 5/2022 | Haase | H04L 41/0853 |
| 2022/0239528 A1* | 7/2022 | Yamamoto | H04L 12/40 |
| 2022/0271969 A1* | 8/2022 | Owerfeldt | H04W 4/46 |
| 2022/0321655 A1 | 10/2022 | Mendez Rodriguez et al. | |
| 2023/0116328 A1* | 4/2023 | Gopal | H04L 12/40169 |
| | | | 370/257 |
| 2023/0169805 A1* | 6/2023 | Ramnani | G07C 5/008 |
| | | | 701/29.3 |
| 2023/0171314 A1* | 6/2023 | Onti Srinivasan | G06F 18/2431 |
| | | | 370/474 |
| 2023/0271628 A1* | 8/2023 | Watts | B60W 50/023 |
| | | | 701/28 |
| 2023/0275877 A1* | 8/2023 | Harel | G01C 21/3822 |
| | | | 713/189 |
| 2023/0282036 A1* | 9/2023 | Simoudis | G07C 5/008 |
| 2023/0351821 A1* | 11/2023 | Kim | B60K 35/28 |
| 2023/0377383 A1* | 11/2023 | Makita | G06F 8/70 |
| 2024/0134628 A1* | 4/2024 | Teraoka | G06F 13/00 |
| 2024/0190447 A1* | 6/2024 | Kurita | G06F 9/54 |

OTHER PUBLICATIONS

U.S. Appl. No. 18/065,565, filed Dec. 13, 2022, Roland Mesde, et al.

U.S. Appl. No. 17/710,585, filed Mar. 31, 2022, Roland Mesde, et al.

U.S. Appl. No. 17/710,634, filed Mar. 31, 2022, Roland Mesde, et al.

U.S. Appl. No. 17/710,644, filed Mar. 31, 2022, Roland Mesde, et al.

U.S. Appl. No. 17/806,434, filed Jun. 10, 2022, Roland Mesde, et al.

U.S. Appl. No. 17/809,878, filed Jun. 29, 2022, Roland Mesde, et al.

U.S. Appl. No. 17/809,868, filed Jun. 29, 2022, Roland Mesde, et al.

U.S. Appl. No. 17/160,184, filed Jan. 27, 2021, Assimakis Tzamaloukas, et al.

U.S. Appl. No. 17/037,376, filed Sep. 29, 2020, Michael Garcia, et al.

U.S. Appl. No. 17/710,551, filed Mar. 31, 2022, Rloand Mesde, et al.

U.S. Appl. No. 17/810,301, filed Jun. 30, 2022, Roland Mesde, et al.

U.S. Appl. No. 17/727,592, filed Apr. 22, 2022, Brett Francis.

U.S. Appl. No. 18/065,563, filed Dec. 13, 2022, Roland Mesde.

U.S. Appl. No. 17/709,236, filed Mar. 30, 2022, Edwin Ricardo Mendez Rodriguez, et al.

U.S. Appl. No. 16/581,571, filed Sep. 24, 2019, Michael Christopher Wenneman et al.

U.S. Appl. No. 16/453,921, filed Jun. 26, 2019, Marco Argenti.

U.S. Appl. No. 16/835,070, dated Mar. 30, 2020, Brett Francis.

U.S. Appl. No. 17/014,742, dated Sep. 8, 2020, David Joseph Mifsud.

International Search Report and Written Opinion mailed Jul. 1, 2024 in PCT/US2024/020613, Amazon Technologies, Inc., pp. 1-10.

* cited by examiner

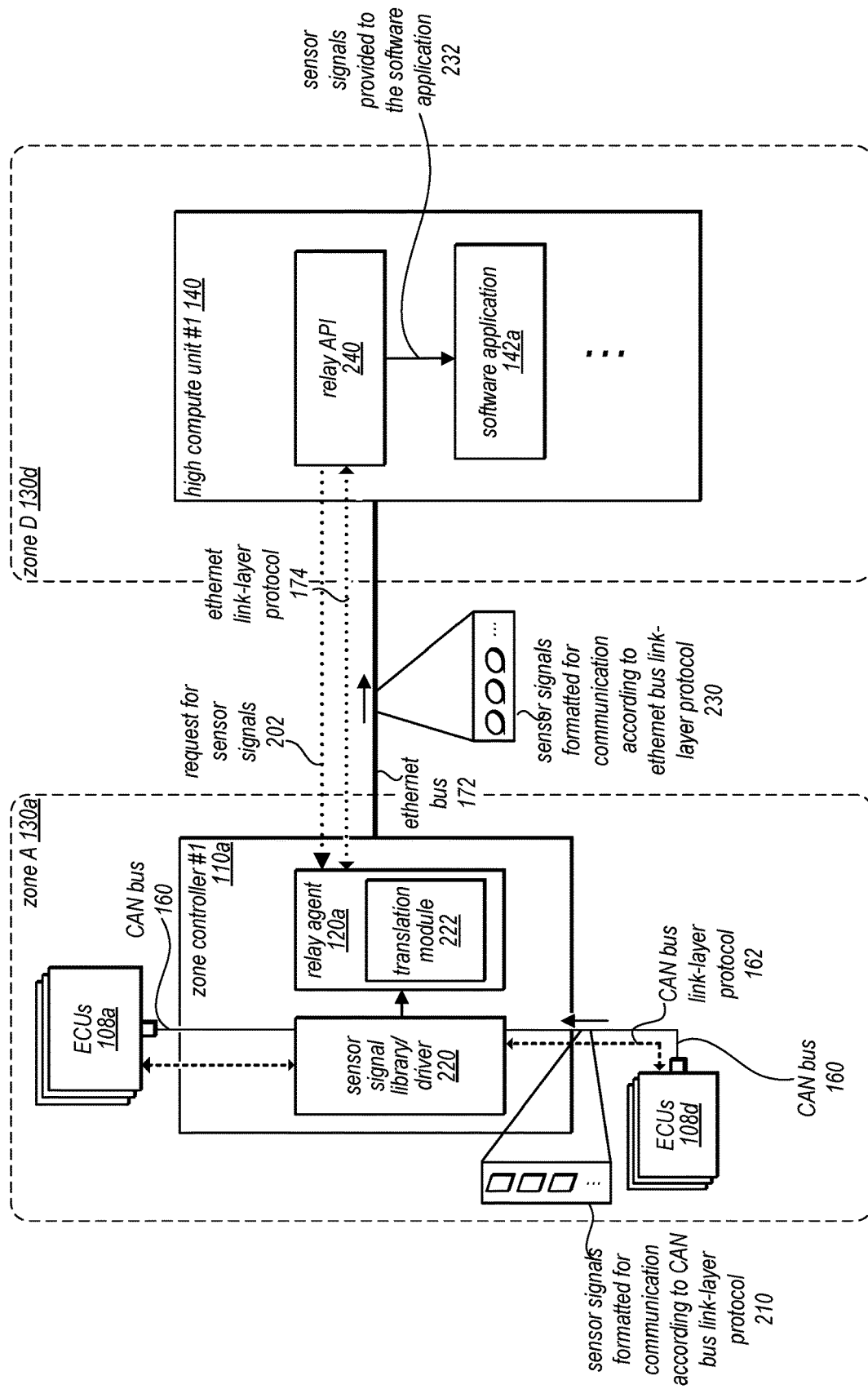

VEHICLE SIGNAL RELAY SERVICE

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicles. Some vehicles may include multiple electronic control units (ECUs) and sensors having various sensor modalities. Additionally, successful execution of a vehicle software application may require that an execution environment of the vehicle software application be able to communicate with multiple ECUs and various sensors having the various sensor modalities. However, a mismatch of communication protocols between that used in the execution environment and that used in the ECUs/sensors may restrict communications between the vehicle software application and ECUs/sensors.

BRIEF DESCRIPTION OF THE DRAWINGS

FIG. 2 illustrates a graphical view of a relay agent of a vehicle signal relay system, its various parts, and interactions to translate and send sensor signals formatted according to a first link-layer protocol (e.g., CAN bus protocol) into sensor signals formatted according to a format that can be communicated using a second link-layer protocol (e.g., ethernet bus protocol), according to some embodiments.

Figure 1:
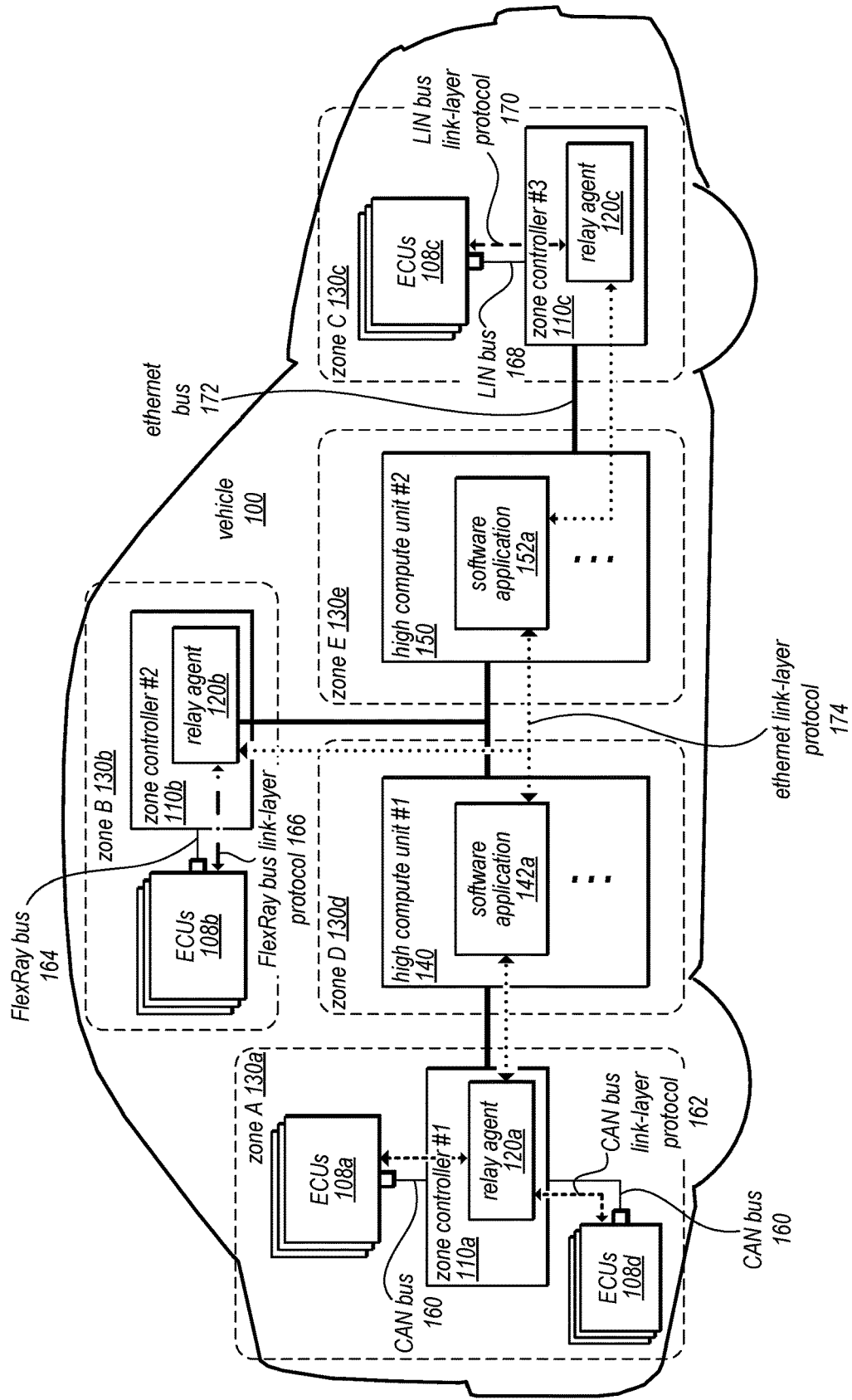
FIG. 1 illustrates a vehicle signal relay system that allows signals from electronic control units (ECUs) using various link-layer protocols in multiple zones of a vehicle to be sent to software applications deployed outside of their respective zones by using relay agents deployed in respective zone controllers to translate various link-layer protocols into a format that can be communicated via an ethernet bus link-layer protocol, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to. Moreover, "translation" of protocols, including translation of a first link-layer protocol to a second link-layer protocol may not be limited to direct translation at a link-layer level of a communication protocol stack, but it should be understood that translation of different link-layer protocols may include translation at any of various different layers of the communication protocol stack built on top of the different link-layer protocols.

DETAILED DESCRIPTION OF EMBODIMENTS

The systems and methods described herein include techniques for implementing a vehicle signal relay system that translates signals formatted using various link-layer protocols used by multiple zones of a vehicle to another format compatible with another link-layer protocol, such as service-Oriented MiddlewarE over IP (SOME/IP), time sensitive network/audio video bridging (TSN/AVB), and/or other ethernet-based protocols. The vehicle agent provides the translated signals (e.g., formatted for communication using an ethernet-based protocol) for transmission to software applications deployed in other zones outside of a respective zone of a respective zone controller where the relay agent is located, according to some embodiments.

For example, modern vehicles are equipped with various electronic control units (ECUs) that use various types of buses and respective link-layer protocols suitable for transmission via the various types of buses. A plurality of communication buses, such as CAN bus, LIN bus, FlexRay, and various other types of communication buses, may be used to send signals between various ECUs, and zone controllers in a zone of a vehicle system. Also, different ones of the ECUs may be connected to sensors having different sensor modalities, or that measure different vehicle parameters. The various communication buses may each utilize respective communication bus link-layer protocols to send and receive information within each of the respective zones. A vehicle may be arranged in a "zonal architecture" such that ECUs of a given zone are connected to a zone controller of the given zone through communications buses that are accessible only to the zone controller within the given zone. Therefore, because ECU communications are limited to a particular communication bus that is specific to a given zonal controller, the sensor signals of a certain zone may be restricted to software applications deployed within the given zone. Also, the sensor signals of a given zone may not be accessible by software applications deployed outside of the given zone, such as at software applications deployed at a centralized compute unit connected to the given zone controller via another bus-type, such as an ethernet bus, or such as at software applications deployed to ECUs in other zones.

Moreover, a vehicle software application that is requested to be deployed in the vehicle may be large and complex with multiple dependencies and computing resource requirements. Various requirements of the software application may restrict deployment of the software application to a given zone controller or ECUs of the given zone. For example, a zone controller connected to a brake sensor ECU using a CAN bus protocol may have access to brake sensor signals but may be limited in computing capacity. The lack of compute resources of the zone controller connected to the brake sensor ECU may prevent the zone controller connected to the brake sensor ECU from accepting deployment of a particular software application requiring more than a threshold amount of computing capacity. However, the same software application may not be deployed in another compute unit outside of the zone including the brake sensor ECU, wherein the computing unit in the other zone has sufficient compute resources to host the software application because the brake sensor signals are accessible only through the CAN bus of the zone that includes the brake sensor ECU and are not accessible in the other compute unit outside of the zone that includes the brake sensor ECU. The communication between the compute unit and the zone controller may furthermore be hindered by differing link-layer communication protocols used in the respective zones or for communications between zones. For example, a link-layer communication protocol used for connecting the compute unit and the zone controller may be a link-layer protocol suitable for a different hardware specific bus that uses a different specific link-layer protocol as compared a link-layer protocol used for communications over the communication bus connecting the ECUs with the zone controller. For example, the compute unit and the zone controller may be connected via an ethernet communication bus but the ethernet bus link-layer protocol may not be used to send signals to sensors connected to the zone controller using a CAN bus (or another hardware specific bus using a different hardware specific link-layer protocol that is incompatible with ethernet protocol). As can be seen, providing communication between a vehicle software application deployed, or to be deployed, in compute units located outside of a zone having required sensor signals needed by the software application presents a non-trivial challenge.

In some embodiments, a relay agent that is deployed in a zone controller (or other ECUs of the zone) may comprise a vehicle signal relay system and may be able to translate sensor signals generated in a first zone and may allow a compute location (e.g., a high compute unit) outside of that first zone to access the sensor signals of sensors within the first zone. Furthermore, the relay agent may provide a mechanism to allow routing of signals translated between two incompatible link-layer protocols (such as from CAN bus protocol to ethernet bus protocol) and may allow additional available deployment locations for deploying the software application. For example, a relay agent deployed in a zone controller in zone A of a vehicle system may route a signal received according to a CAN bus protocol, translate the signal according to a format that can be communicated using an ethernet bus protocol, and route the translated signal to a software application deployed in a high compute unit in zone B of the vehicle system via an ethernet bus connecting the zone controller and the high compute unit.

Moreover, routing of a sensor signal to a software application of a high compute unit in another zone may be performed without the software application having to have sensor location information pre-configured in the application. For example, details of how the sensor signal is acquired may be abstracted away from the software application. As a further example, a software application may send a multicast discovery message via a relay agent application programing interface (relay agent API) to determine which of the zone controllers of various zones of the vehicle has access to a requested sensor signal. Subsequent to receiving the multicast message, the relay agent connected to the sensor signal may send a response comprising metadata via a connection offer, wherein the metadata indicates to the software application and/or relay agent in a local zone where the software application is executing and that a relay agent connected to the sensor signal can provide the requested sensor signal. Furthermore, the vehicle signal relay system may perform mutual attestation using cryptographic tokens and/or tokens signed by an authority having a valid root of trust, and allow the software application to subscribe to the requested vehicle sensor signal. For example, the software application may send a cryptographic token to the relay agent to verify that the software agent has authorization to receive the sensor signal and the relay agent may send a token signed by an authority having a valid root of trust for the zone controller to verify the identity of the zone controller and the sensor signal. Additionally, in some embodiments, the sensor signal request may be a subscription request for sensor signals to be continually provided to the software application and may indicate a desired signal formatting. For example, the subscription request may indicate the communication protocol used between the software application and the relay agent to conform to a quality-of-service requirement including sending the sensor signal using a best-effort transmission protocol such as service-Oriented MiddlewarE over IP (SOME/IP) or a deterministic protocol such as a Time Sensitive Network (TSN) protocol. In some embodiments, the relay agent may receive multiple subscription requests from multiple software applications of different compute units and may send the translated signals according to the respective subscription requests. The subscription requests may furthermore indicate filters and/or masks to indicate selected portions of the sensor signals to be translated and sent and/or selected portions of the sensor signals to be filtered out and/or masked.

FIG. 1 illustrates a vehicle signal relay system that allows signals from electronic control units (ECUs) using various link-layer protocols in multiple zones of a vehicle to be sent to software applications deployed outside of their respective zones by using relay agents deployed in respective zone controllers to translate various link-layer protocols into a format that can be communicated using an ethernet bus link-layer protocol, according to some embodiments.

A vehicle 100 may include a vehicle system that includes various electronic control units (ECUs) 108a-108d that are connected to respective zone controllers, such as zone controller #1 110a, zone controller #2 110b, and zone controller #3 110c. In some embodiments, the ECUs 108a-108d may be connected to the respective zone controllers using various types of communication buses. For example, the vehicle system comprising the various ECUs 108-108d may be arranged such that the ECUs 108a and 108d are connected to the zone controller #1 110a via a Controller Area Network (CAN) bus 160 using a CAN bus link-layer protocol 162. Furthermore, the ECUs 108b may be connected to the zone controller #2 110b via a FlexRay bus 164 using a FlexRay bus link-layer protocol 166, and the ECUs 108c may be connected to the zone controller #3 110c via a Local Interconnect Network (LIN) bus 168 using a LIN bus link-layer protocol 170. In some embodiments, the various ECUs 108a-108d and their respective zone controllers 120a-120c may be arranged in a hub-and-spoke topology where a zone controller (the hub) may be connected to multiple ECUs (the spokes). Further note that in some embodiments, some vehicles may use more or fewer bus-types than shown in FIG. 1. For example, while FIG. 1 shows a CAN bus, a FlexRay bus, a Lin bus, etc. all used in a same vehicle 100. Some vehicles may use CAN bus and Ethernet or FlexRay and Ethernet but not both, as an example. Nevertheless, a relay agent, as described herein, may be configured to handle any such combination. Said another way, a relay agent, as described herein, may be used in a vehicle that uses CAN bus and Ethernet and the same relay agent software may likewise by installed in a different vehicle that uses a FlexRay bus and Ethernet, etc. Thus, various bus types are shown in FIG. 1 as example formats that may be supported by a relay agent, but others may also be supported in addition to those shown in FIG. 1.

The vehicle system of the vehicle 100 may furthermore include one or more high compute units, such as a high compute unit #1 140 and a high compute unit #2 150 that may be used to provide processing capacity to the vehicle 100. In some embodiments, each of the respective ECUs 108a-108d that are connected to the respective zone controllers 110a-110c may be considered to be in a same zone of the vehicle 100. Note that the high compute units may be implemented using various types of on-board vehicle computing devices, but generally will have a higher computing capacity than the individual ECUs of the zones. Though, in some embodiments, the high-compute units could have any level of computing capacity. In some embodiments, one or more zones of the vehicle 100 may be delineated based on components of the vehicle 100 (including the ECUs 108a-108d and zone controllers 110a-110c) sharing a same physical communication bus and same link-layer protocol. For example, ECUs 108a and 108d are connected to the zone controller #1 110a using the CAN bus 160 and the CAN bus link-layer protocol 162 may delineate zone A 130a. Moreover, the ECUs 108b are connected to zone controller #2 110b using FlexRay bus link-layer protocol 166, which may delineate zone B 130b, and ECUs 108c are connected to zone controller #3 110c using LIN bus 168, which may delineate zone C 130c. In some embodiments, the respective high compute units #1 (140) and #2 (150) may be in separate zones. For example, high compute units #1 140 may be in zone D 130d and high compute units #2 150 may be in zone E 130e. Each of the zone controllers #1-3 110a-110c and the high compute units 140 and 150 may be connected to one another via an ethernet bus 172 using an ethernet link-layer protocol 174. In some embodiments, another set of ECUs and another zone controller may have the same type of physical communication bus (e.g., CAN bus) and use the same link-layer protocol (e.g., CAN bus protocol) but may be considered to be in a different zone because the physical communication bus of the other set of ECUs and the other zone controller are not within a same physical bus network. Said another way, multiple different zones (such as a vehicle navigation zone and a vehicle braking zone) may both use the CAN bus protocol, but may be set up as physically separate zones that each have their own separate physical CAN bus. In some embodiments, the various zones may be separated by another type of physical communication bus (e.g., ethernet bus separating two different CAN buses).

As discussed above, software applications deployed in high compute units of a zone separate from the zones including the local ECUs may not have access to ECUs of the other zones. For example, software applications executing in the high compute units may not have access to various sensor signals due, in some embodiments, to the difference in communication bus/link-layer communication protocol used between a given high compute unit hosting the software application and a zone controller having access to ECUs and associated sensor signals. For example, a software application 142a deployed on the high compute unit #1 140 in zone D 130d may not have access to sensor signals of ECUs 108d, as those signals are accessible only through the CAN bus 160. The communication between the high compute units and the various zone controllers may be hindered due to the differing link-layer communication protocols used in the respective zones. For example, the different hardware-specific physical communication busses, such as the CAN bus 160 and the ethernet bus 172, may use different respective specific link-layer protocols (CAN bus protocol and ethernet bus protocol respectively) and may not be compatible with one another.

In some embodiments, one or more relay agents 120a-120c deployed in respective zone controllers #1-3 110a-110c may be able to translate sensor signals generated in respective zones 130a-130c into a format that can be communicated using the ethernet link-layer protocol 174 (or another protocol used to communicate between the respective zone controllers and respective high compute units), and provide a mechanism to route signals between the two buses using the incompatible link-layer protocols. For example, one or more relay agents may translate a first protocol used between the ECUs and the zone controllers into a second protocol used for communications between the zone controllers and the high compute unit (located outside of the zone). This may allow software applications 142a and 152a to be deployed on one or more available high compute units (or another zone controller) not in the same zone. For example, a relay agent 120a deployed in the zone controller #1 110a in zone A 130a of the vehicle system may route a signal received according to a CAN bus protocol 162, translate the signal to be formatted according to a different format understandable to the application and cause the translated sensor signal to be packaged according an ethernet bus protocol 174, and route the translated signal to a software application 142a deployed in a high compute unit #1 140 in zone D 130d via an ethernet bus 172 connecting the zone controller #1 110a and the high compute unit #1 140. In some embodiments, the software application 142a and other software applications may be deployed in any of the various zone controller #1-#3 110a-110c and/or other compute units in a zone outside of the respective ECUs using a relay agent. In some embodiments, the relay agents 120a-120c may be pre-configured in the respective zone controllers #1-3 110a-110c. In other embodiments, the one or more relay agents 120a-120b may be deployed to the respective zone controllers #1-3 110a-110c.

FIG. 2 illustrates a graphical view of a relay agent of a vehicle signal relay system, its various parts, and interactions to translate and send sensor signals formatted according to a first link-layer protocol (e.g., CAN bus protocol) into sensor signals formatted for communications according to a second link-layer protocol (e.g., ethernet bus link-layer protocol), according to some embodiments.

In some embodiments, the relay agent 120a may include a translation module 222 that is able to translate and/or re-format sensor signals into a format that can be communicated according to the ethernet bus link-layer protocol 230 and provide the translated/re-formatted sensor signals to be sent over to the software application 142a via the ethernet bus 172. For example, one or more sensor signals formatted according to CAN bus link-layer protocol 210 may be received at the zone controller #1 110a in zone A 130a via the CAN bus 160. In some embodiments, a sensor signal library/driver 220 of the zone controller #1 110 may provide relevant software code to interface with the ECUs 108a and 108d and interpret sensor signals received from the ECUs, including the sensor signals 210. In some embodiments, the translation module 222 may receive the sensor signals 210 from the sensor signal library/driver 222 and translate the received sensor signals formatted according to the CAN bus link-layer protocol 162 to a format understandable to an application and package the translated signals in a format suitable to communication using ethernet link-layer protocol 174. In some embodiments, the translation module 222 may not directly translate the received sensor signals formatted according to the CAN bus link-layer protocol 162 to ethernet link-layer protocol 174, but may translate the received signals indirectly by encapsulating message packets comprising the sensor signals formatted according to the CAN bus link-layer protocol 162 with an envelope that conforms to the ethernet link-layer protocol 174.

In some embodiments, the relay agent may send the sensor signals formatted according to the ethernet bus link-layer protocol 230 as a response to a request for sensor signals 202 sent from the high compute unit #1 140 using a relay API 240. The relay API 240 may provide an abstraction layer in communications with the relay agent 120a such that the software application may be freed from having to be pre-configured with specific communications protocol or other information regarding the vehicle system layout to communicate with various zone controllers/relay agents. In some embodiments, the request for sensor signals 202 may be a subscription request to receive a requested sensor signal as discussed further in FIG. 3A-3C.

Figure 3A:
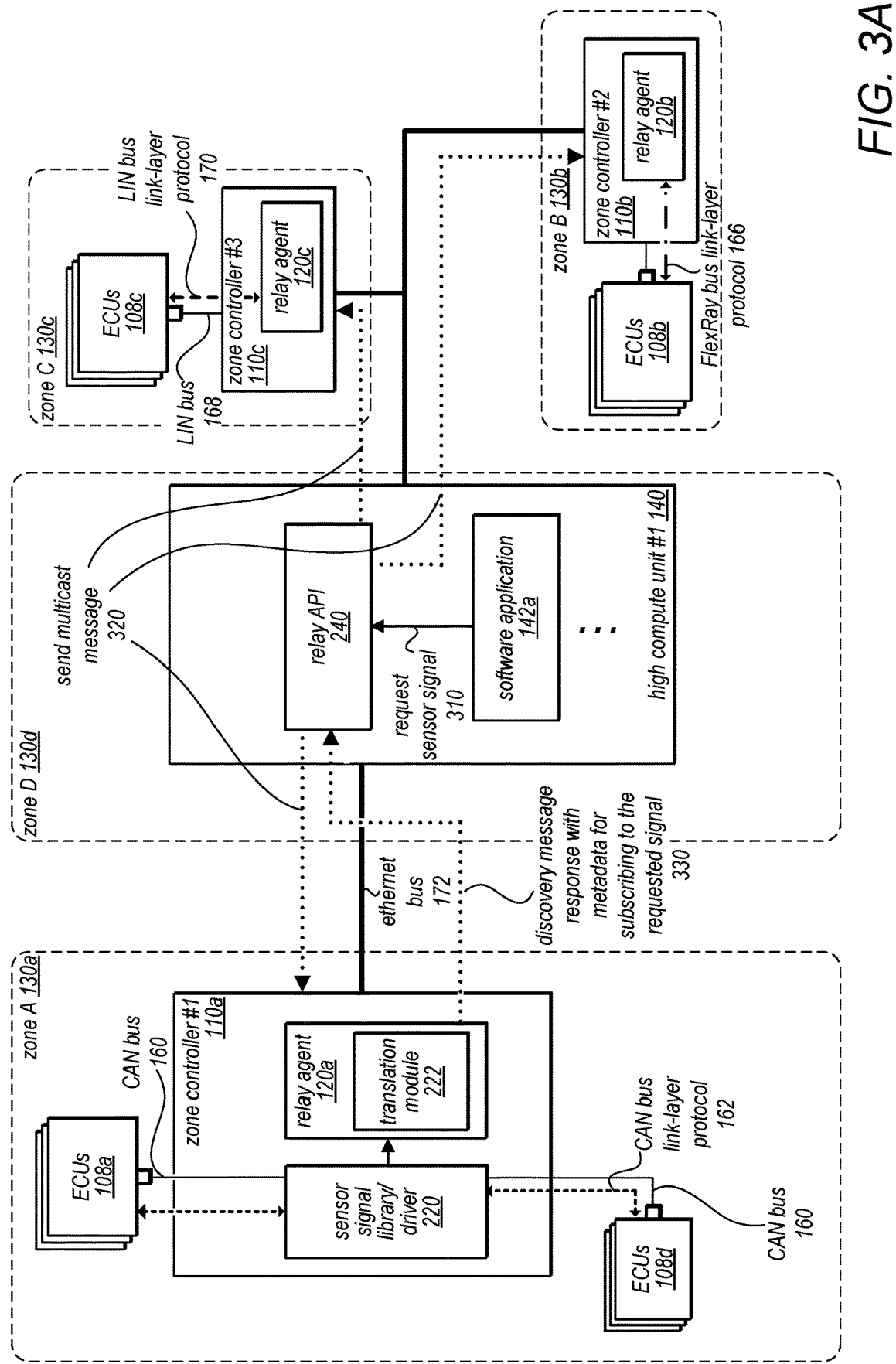
FIG. 3A illustrates a more detailed view of a relay agent of a vehicle signal relay system that receives a request for sensor signals, receives a multicast message sent to multiple zone controllers, and sends a discovery message response comprising metadata for subscribing to the requested signals, according to some embodiments.

FIG. 3A illustrates a more detailed view of a relay agent of a vehicle signal relay system that receives a request for sensor signals, receives a multicast message sent to multiple zone controllers, and sends a discovery message response comprising metadata for subscribing to the requested signals, according to some embodiments.

In some embodiments, the software application 142a may request sensor signal 310 using the relay API 240. The request for sensor signal 310 may be for one or more specific sensor signals from a specific ECU and/or for sensor signals from an ECU of a specific type. For example, the request for sensor signal 310 may be a request for sensor signals from a specific ECU(s) of ECUs 108d having a specific sensor ID(s). In some embodiments, the request for sensor signals 310 may be for a specific type of signals, such as a sensor signals from a brake sensor. Based on the request for sensor signal 310, the relay API 240 may send a multicast message 320 to the various zone controllers #1-3 110a-110c in the various zones 130a-130c. The relay API 240 may send the multicast message 320 to the various zone controllers #1-3 110a-110c based on a routing table stored in the high compute unit #1 140 and/or based on a routing table stored in one or more routing agents of the ethernet bus 172. The multicast message 320 in some embodiments, may be propagated by the one or more zone controllers #1-3 110a-110c to other zone controllers of which the high compute unit #1 110a does not have the respective network address for, such that the other zone controllers were not including when the multicast message 320 was initially sent.

In some embodiments, the multicast message may include identification of a specific sensor signal or the sensor type that is desired by the software application, and based on a successful match, a relay agent may respond with a relay offer for the software application to receive the requested signal. For example, based on the multicast message 320 that was sent by the relay API 240 of the high compute unit #1 140 for sensor signals from a given ECU having access to a certain sensor ID, the relay agent 120a may send a discovery message response upon determining that one of the ECU of the ECUs 108*d* has access to a matching sensor ID. The relay agent 120*a* may send the discovery message response comprising metadata for subscribing to the requested signal 330 to the software application 142*a* of the high compute unit #1 140 via the relay API 240. In some embodiments, relay agent 120*c* of zone controller #3 110*c* in zone C 130*c* and relay agent 120*b* of zone controller #2 110*b* in zone B 130*b* may not send a discovery message based on a lack of a match of the requested ECUs and/or type of ECUs (or associated sensor signals). In some embodiments, despite the match of the requested ECUs/type of ECUs (or associated sensor signals), relay agents may not send the discovery response based on a configuration of the zone controller to restrict signals from the ECUs/requested ECUs to their respective zones. In some embodiments, the metadata may include one or more pieces of information identifying the location of the zone controller #1 110*a*, such as a network address (e.g., IP address), having the matching ECUs (or associated sensors signals) as requested in the multicast message.

Figure 3B:
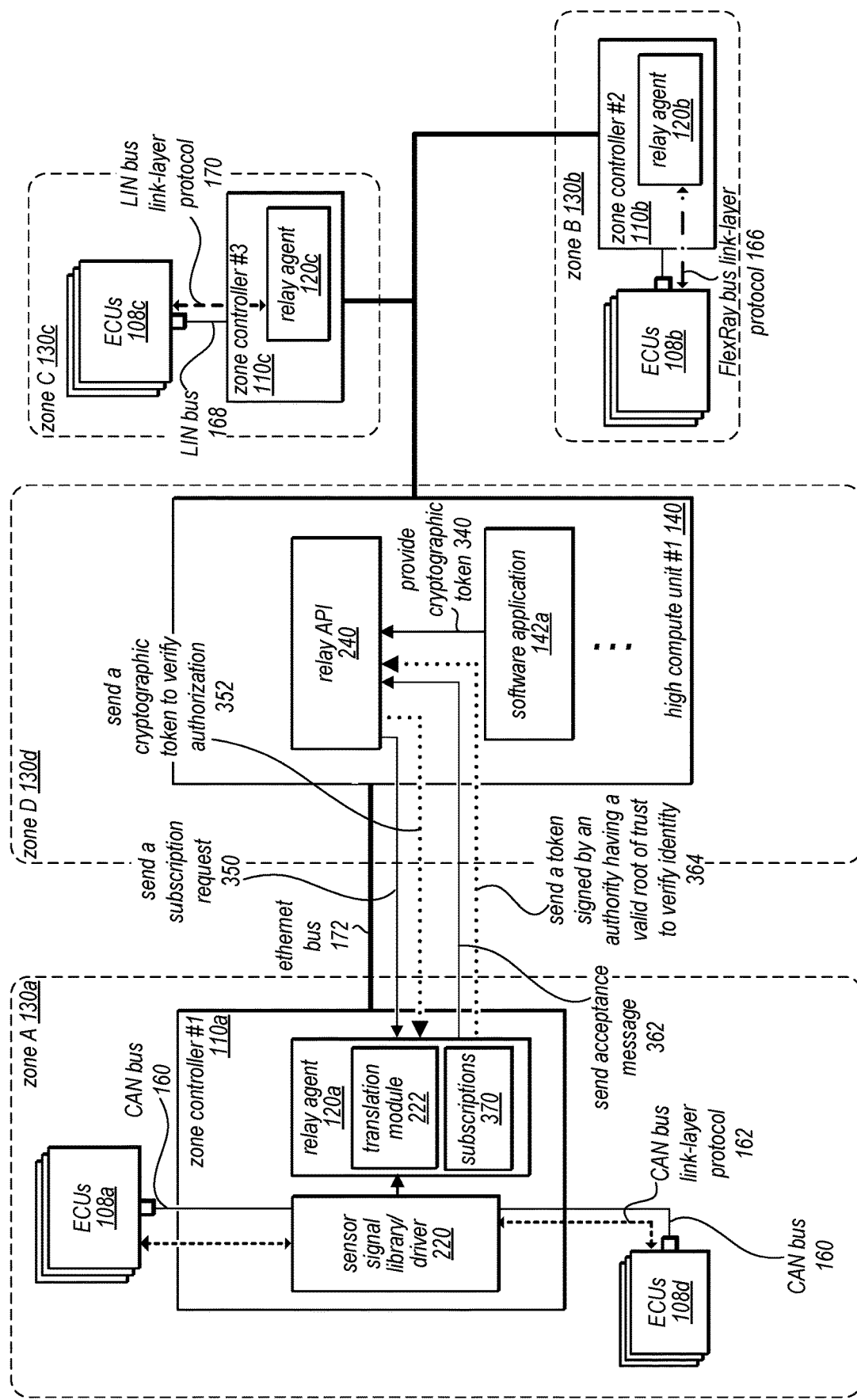
FIG. 3B illustrates a more detailed view of a relay agent of a vehicle signal relay system that receives a subscription request for sensor signals, sends an acceptance message, and performs attestation of authorization and/or identity between a software application and a zone controller of the relay agent, according to some embodiments.

FIG. 3B illustrates a more detailed view of a relay agent of a vehicle signal relay system that receives a subscription request for sensor signals, sends an acceptance message, and performs attestation of authorization and/or identity between a software application and a zone controller of the relay agent, according to some embodiments.

In some embodiments, based on the discovery message response with metadata for subscribing to the requested signal 330 sent to the software application 142*a* of the high compute unit #1 140, the software application 142*a* may send a subscription request 350 to the relay agent 120*a*. For example, based on the metadata from the relay agent 120*a*, the relay API 240 may directly send a subscription request 350 to the relay agent of the zone controller #1 110*a*. In some embodiments, the relay API 240 may send the subscription request 350 to the relay agent 120*a* using the network address of the zone controller #1 110*a* obtained from the metadata. In some embodiments, the subscription request may identify specific ones of the sensor signals from the multiple available ECUs such as ECUs 108*a* and ECUs 108*d* that are connected to the zone controller #1 110*a*. In some embodiments, the software application 142*a* may provide a cryptographic token 340 to the relay API 240 to be sent as part of the subscription request. The relay API 240 may send the cryptographic token received from the software application 142*a* to verify authorization 352 of the software application 142*a* to receive the requested sensor signals. In some embodiments, one or more keys and certificates stored in a secure location within the ECUs 108*a* and 108*d* may be used to verify that the cryptographic token from the software application 142*a* is a valid token.

In some embodiments, the relay agent 120*a* may store the subscription request 350 as part of the subscriptions 370 that it has received and in return send an acceptance message 362 to the software application 142 via the relay API 240. In some embodiments, the relay agent 120*a* may send a token signed by an authority having a valid root of trust to verify identity 364 of the zone controller #1 110*a*. The cryptographic token described above may be used to verify authorization 352 and the token signed by the authority having the valid root of trust for the zone controller may be used to verify identity 364 of the zone controller. Also, both of these may be used as part of a mutual attestation phase of the connection process. In some embodiments, the attestation may be partial and require only one of the zone controller #1 110*a* or the software application 142*a* to be verified. In some embodiments, the cryptographic token to verify authorization of the software application may be signed by an authority having a valid root of trust for the high compute unit #1 140. In some embodiments the authority having the valid root of trust may be a centralized authority accessible to both the zone controller #1 110*a* and the high compute unit #1 140. In some embodiments, subsequent to a receipt of a token signed in a way that indicates a valid root of trust, the relay agent may send encrypted sensor signals to the relay API as further discussed in FIG. 6B.

Figure 3C:
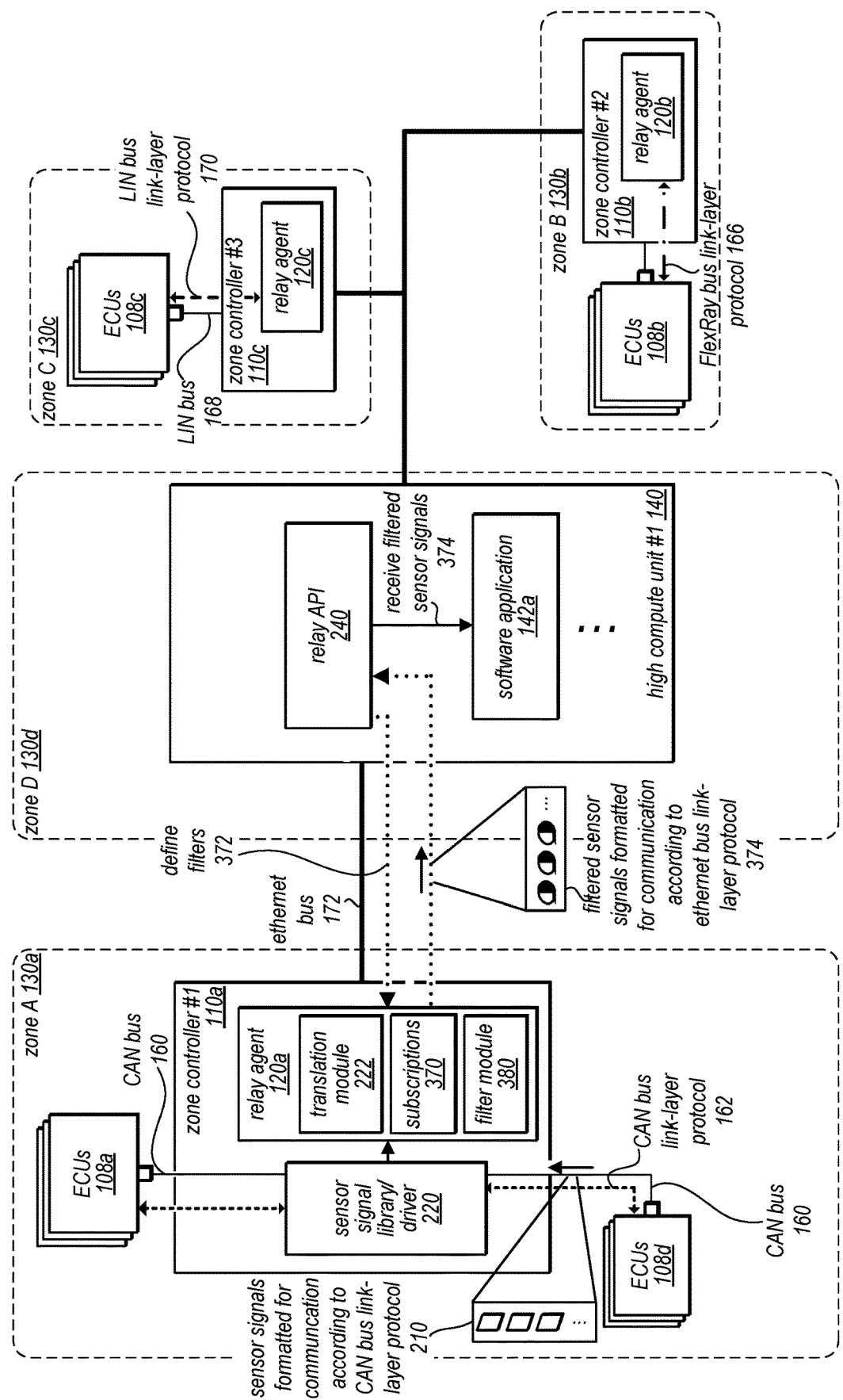
FIG. 3C illustrates a more detailed view of a relay agent of a vehicle signal relay system that receives a filter and/or a selection of a filter to be used to filter certain portions of the requested sensor signals, wherein the remaining portions of the filtered sensor signals are translated from a CAN bus link-layer protocol to a format that can be communicated using an ethernet bus link-layer protocol, according to some embodiments.

FIG. 3C illustrates a more detailed view of a relay agent of a vehicle signal relay system that receives a filter/selection of a filter to select certain portions of the requested sensor signals translated from a CAN bus link-layer protocol to a format that can be communicated using an ethernet bus link-layer protocol, according to some embodiments.

In some embodiments, the relay agent 120*a* may receive indications/instructions to define filters 372 from the software application 142*a*. The filters may indicate one or more components of the sensor signals to send to the software application. For example, the software application 142*a* may indicate to filter a requested temperature sensor signals such that only signals higher than a threshold temperature be sent to the software application 142*a*. In some embodiments, a filter module 380 may apply filters to incoming signals from the temperature sensor prior to the signal being translated into a format for communication using another link-layer protocol such that only the relevant signals that are not filtered out are translated. In some embodiments, filters may be defined as part of a separately defined filter request or as part of the subscription request sent by the software application 142*a*. In some embodiments, the filter module 380 of the relay agent 120*a* may maintain filters received by the relay agent from various software applications 142*a* and update/remove filters. The filter module may be associated with certain subscriptions and may be updated/removed as the associated subscriptions are removed as further discussed in FIG. 5B. In some embodiments, a zone controller may be configured with filters to remove information not authorized to be shared outside of the given zone. For example, a given sensor may generate multiple streams of sensor data. In some circumstances, an owner of the sensor (e.g., OEM, Tier-1 supplier, etc.) may authorize sharing of one or more of the streams but not others. In such circumstances, a filter may be applied to remove unauthorized streams prior to translation and sharing of the sensor signal outside of the zone.

Figure 4:
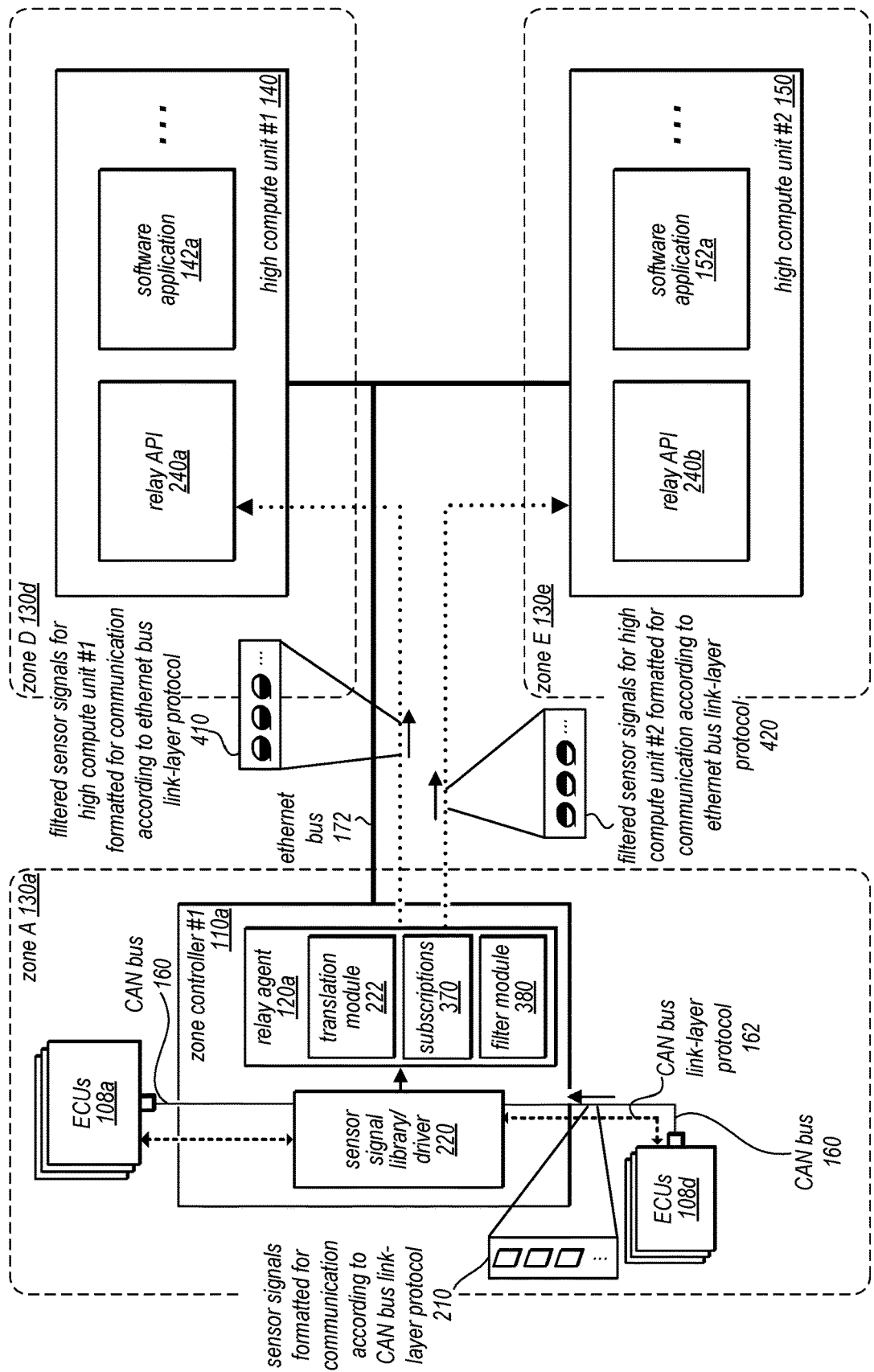
FIG. 4 illustrates a more detailed view of a relay agent of a vehicle signal relay system that sends to respective software applications, of multiple high compute units, respective filtered sensor signals translated from a CAN bus link-layer protocol to a format that can be communicated using an ethernet bus link-layer protocol, according to some embodiments.

FIG. 4 illustrates a more detailed view of a relay agent of a vehicle signal relay system that sends filtered sensor signals to respective software applications of multiple high compute units, wherein the respective filtered sensor signals are translated from a CAN bus link-layer protocol to a format that can be communicated using an ethernet bus link-layer protocol, according to some embodiments.

In some embodiments, a relay agent 120*a* may send filtered sensor signals for high compute unit #1 110*a* formatted according to ethernet bus link-layer protocol 410 and filtered sensor signals for high compute unit #2 110*b* formatted according to ethernet bus link-layer protocol 420 based on multiple subscriptions 370 of the zone controller #1 110*a* for the same sensor signal. For example, the relay agent 120*a* may have received multiple subscription request for the same sensor signals from ECUs 108*d* and may, in some embodiments, have received valid cryptographic tokens from the respective software applications from which the multiple subscription requests were sent. Subsequent to the zone controller #1 110*a* receiving the subscribed signals from ECUs 108*d* via the CAN bus 160, the relay agent 120*a* may determine that the sensor signals are to be translated from the CAN bus link-layer protocol 162 into a format for communication via the ethernet bus link-layer protocol and provide the translated sensor signals to be sent to both software applications in different high compute units in different zones. For example, the sensor signals may be provided to both the software application 142a in high compute unit #1 140 in zone D 130d and to software application 152a in high compute unit #2 150 in zone E 130c. In some embodiments, the filter module 380 may filter the signals based on the respective destinations associated with the filters defined as discussed in FIG. 3C. For example, in addition to the multiple subscription requests, the relay agent 120a may have received two different indication/instructions to define filters from the respective software applications 142a and 152a. Based on the defined filters, two sensor signals each filtered accordingly and translated from the CAN bus link-layer protocol 162 may be sent to the respective software applications 142a and 152a. Thus, the same sensor signal may be filtered differently when different filters are associated with different destinations.

Figure 5A:
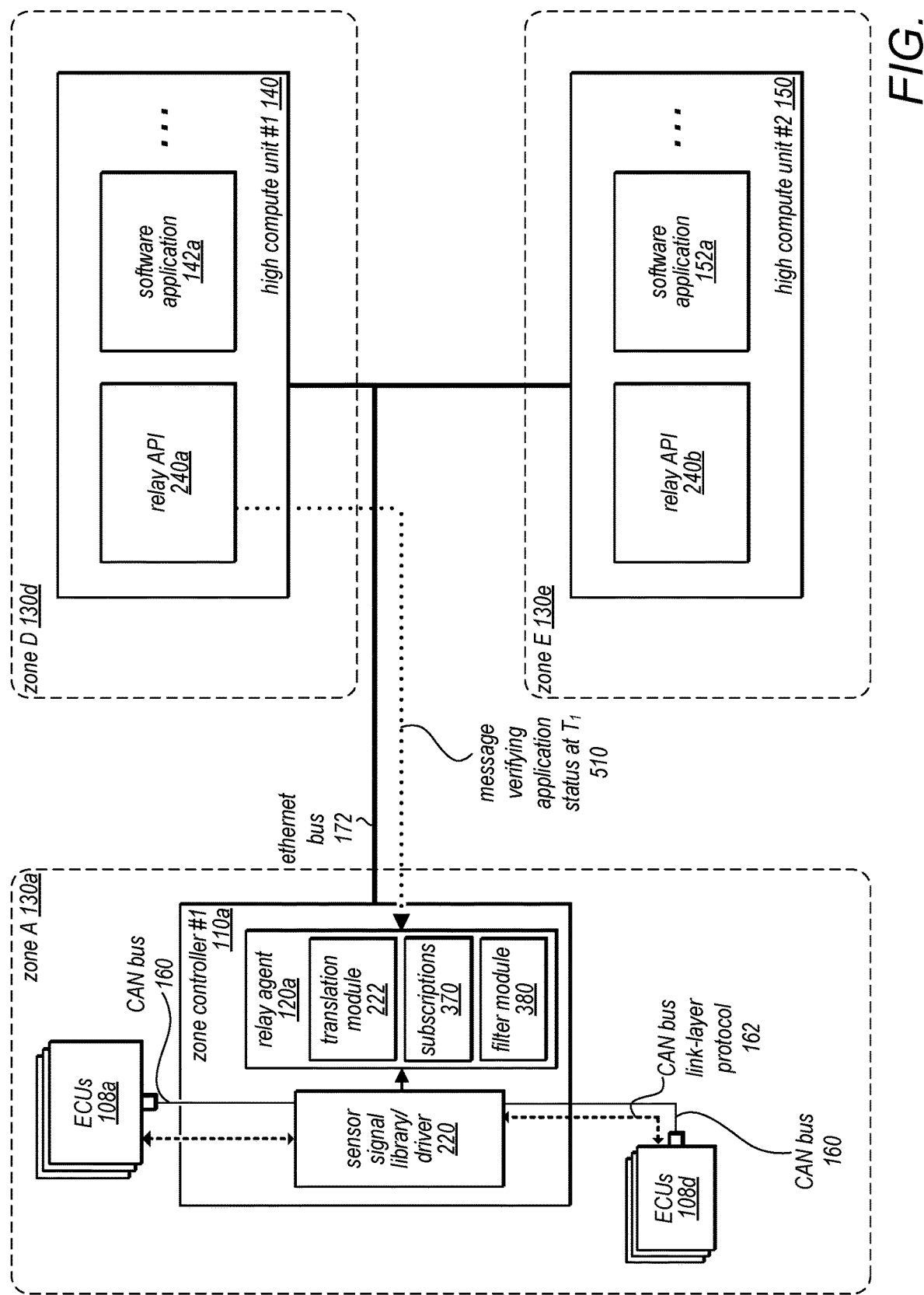
FIG. 5A illustrates a more detailed view of a relay agent of a vehicle signal relay system that receives a message (e.g., heartbeat) verifying application status of an application of a high compute unit in a different zone of a vehicle, according to some embodiments.

FIG. 5A illustrates a more detailed view of a relay agent of a vehicle signal relay system that receives a message (e.g., heartbeat) verifying application status of an application 510 of a high compute unit in a different zone of a vehicle, according to some embodiments.

In some embodiments, a message used for verifying application status at $T_1$ 510 may be a heartbeat message indicating that the software application 142a remains active. In some embodiments, the message used for verifying application status at $T_1$ 510 may be other types of messages that may be interpreted as a heartbeat message. For example, the messages may be a define filter request, an additional subscription request, or other types of messages that may indicate an active status of the software application 142a. The time $T_1$ in which the message used for verifying application status 510 is received may be stored in the relay agent 120a and may be used to manage subscriptions from associated software applications. For example, a message verifying application status at $T_1$ 510 may be sent from the software application 142a of the high compute unit #1 140 to the relay agent 120a of the zone controller #1 110a and the received message may be used to manage subscriptions from the associated software application 142a.

Figure 5B:
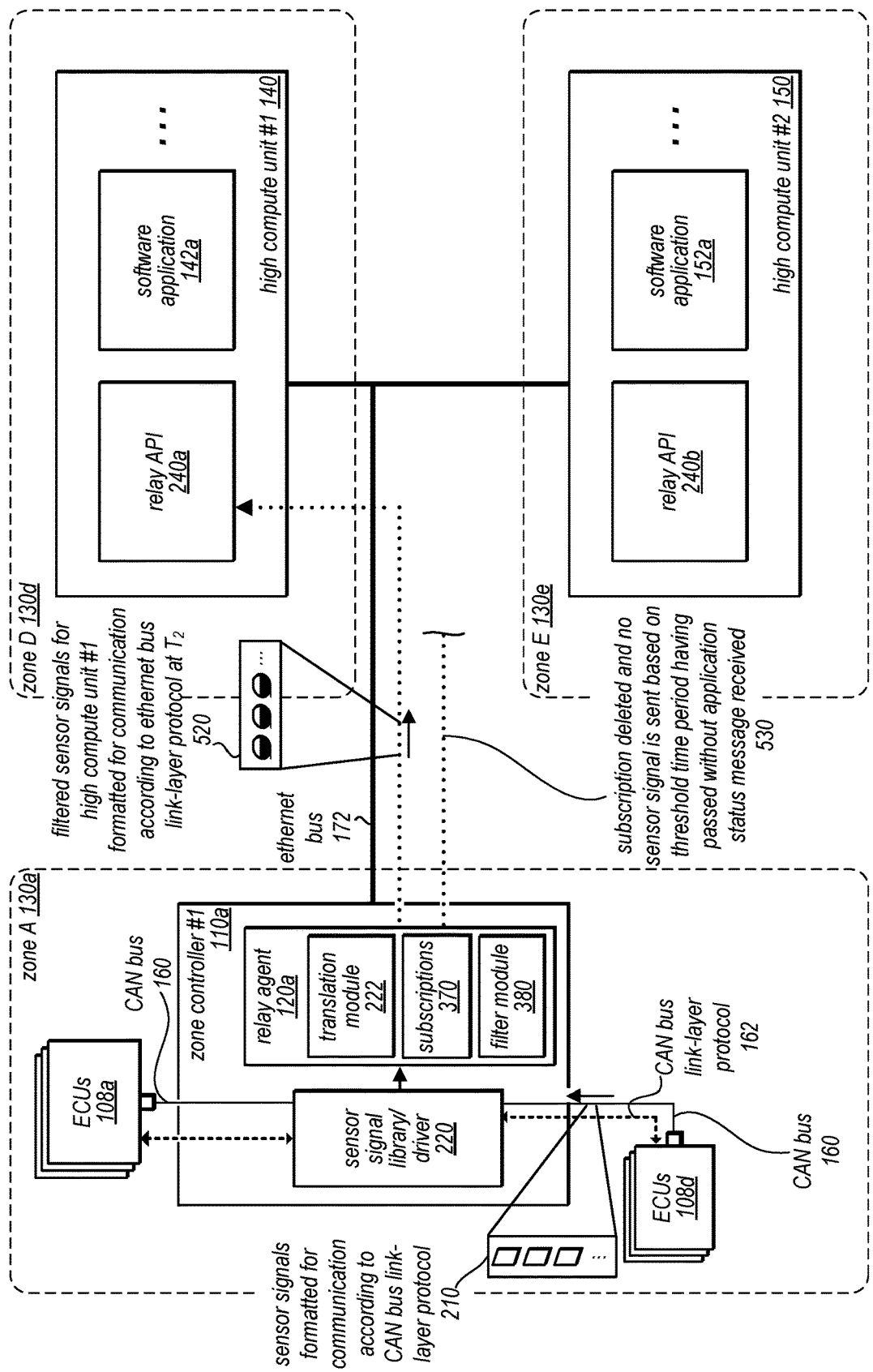
FIG. 5B illustrates a more detailed view of a relay agent of a vehicle signal relay system that sends filtered sensor signals translated from a CAN bus link-layer protocol to a format that can be communicated using an ethernet bus link-layer protocol, wherein the continued sending of the filtered and translated sensor signals is based on a message (e.g., heartbeat) verifying application status, wherein the continuance of the sending of the sensors signals is contingent on the heartbeat message being received within a threshold duration of time indicating active status, according to some embodiments.

FIG. 5B illustrates a more detailed view of a relay agent of a vehicle signal relay system that sends filtered sensor signals translated from a CAN bus link-layer protocol to a format for communication using an ethernet bus link-layer protocol based on a message (e.g., heartbeat) verifying application status, wherein the heartbeat message is received within a threshold amount of time, according to some embodiments.

In some embodiments, based on the message used for verifying application status at $T_1$ sent from the software application 142a, the subscription for the software application 142a stored in subscriptions 370 may remain active. Based on the active subscription, and as discussed in FIG. 2 and FIG. 3C, the relay agent 120a may translate the received sensor signals formatted according to CAN bus link-layer protocol 210 into sensor signals formatted according to a format compatible with sending the sensor signals using the ethernet link-layer protocol. Furthermore, based on the active subscription, the relay agent 120a may send to the software application 142a filtered sensor signals at $T_2$ 520 (via high compute unit #1 140, wherein the filtered sensor signals are formatted according to the format for communication using the ethernet bus link-layer protocol). In some embodiments, the relay agent 120a may delete the subscription based on a threshold time period having passed without an application status message being received by the relay agent from that software application. The relay agent 120a therefore may not send sensor signals that would otherwise have been sent to the software agent 152a (if the subscription is lapsed for lack of activity). For example, a subscription for sensors signals for software application 152a may be deleted (or otherwise discontinued) based on the lack of a heartbeat message or other application status message being received within a certain amount of time and the translated sensor signals may therefore not be sent. The relay agent 110a may utilize the stored messages associated with the respective software applications (e.g., software application 142a, software application 152a) to go through the list of the subscriptions and filters associated with the subscriptions maintained by the relay agent 120a and delete (or otherwise discontinue) the subscriptions that for which a heartbeat has not been received within the threshold time period. In some embodiments, the relay agent 120a may remove/update filters associated with the subscriptions that are removed due to lack of messages indicating application status.

Figure 6A:
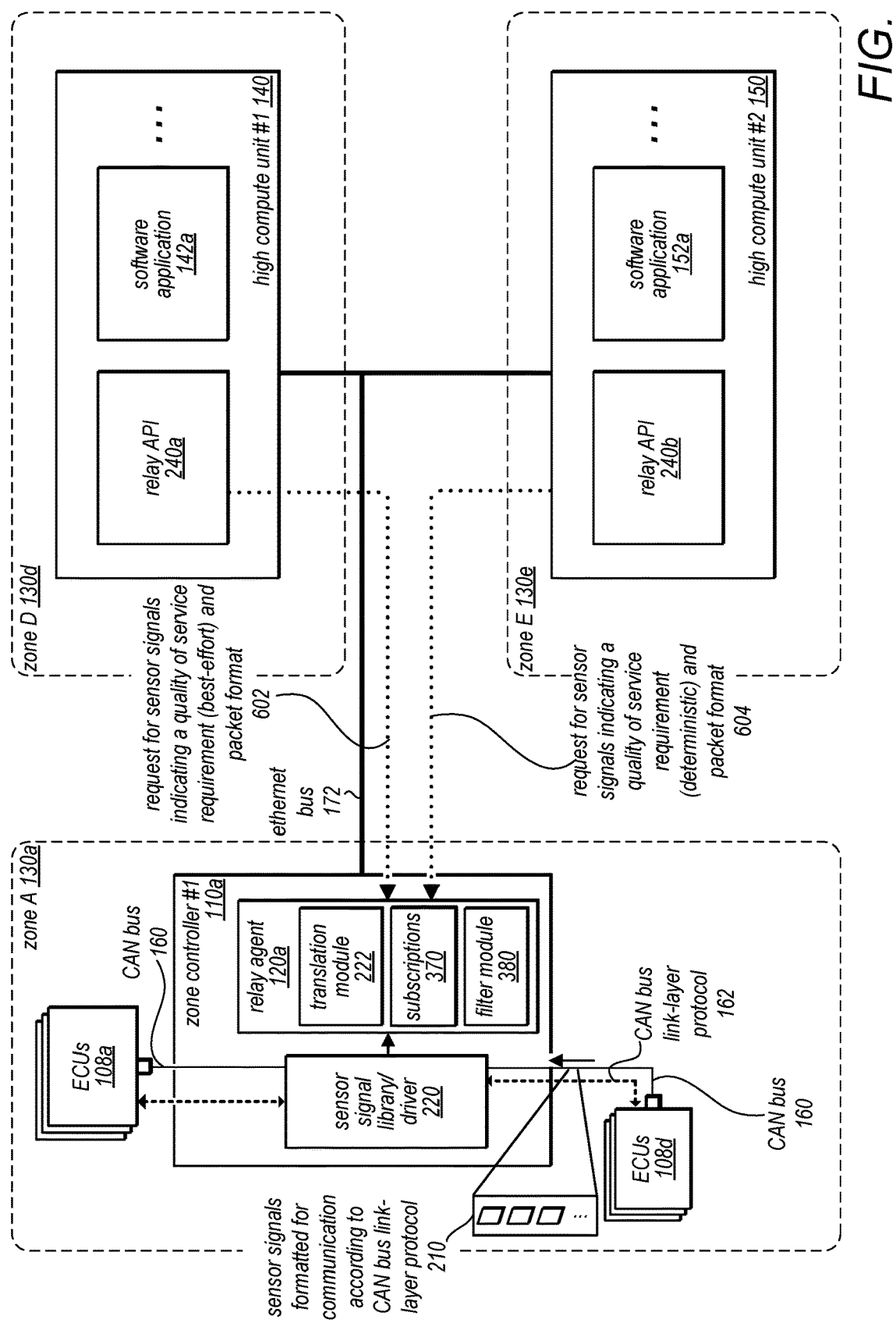
FIG. 6A illustrates a more detailed view a relay agent of a vehicle signal relay system that receives a request for sensor signals and indicates respective quality-of-service requirements and/or packet formats available to be used to provide the requested sensor signal, according to some embodiments.

FIG. 6A illustrates a more detailed view a relay agent of a vehicle signal relay system that receives requests for sensor signals and indicates respective quality-of-service requirements and/or packet format, according to some embodiments.

In some embodiments, the software application 142a may send a request for sensor signals indicating a quality-of-service requirement (best-effort) and packet format 602 and the software application 152a may send a request for sensor signals indicating a quality-of-service requirement (deterministic) and packet format 604. A quality-of-service requirement may indicate a specific communication protocol and/or other various communications settings to guarantee a connection's ability to reliably send the sensor signals in a timely manner as required by the applications and manage communication traffic. The quality-of-service requirements may furthermore specify one or more communications protocol and/or configurations pertaining to a connection's bandwidth (throughput), latency (delay), jitter (variance in latency), and error rate. In some embodiments, the quality-of-service requirement may indicate a specific communication protocol, types of protocols, formatting required in a protocol, or packet size as required by software applications requesting the sensor signals. For example, the quality-of-service requirement indicated in the request from the software application 142a may indicate that the sensor signals be sent to the software application 142a using one or more best-effort communication protocol. In some embodiments, the quality-of-service requirement may indicate that the sensor signals be encrypted.

Figure 6B:
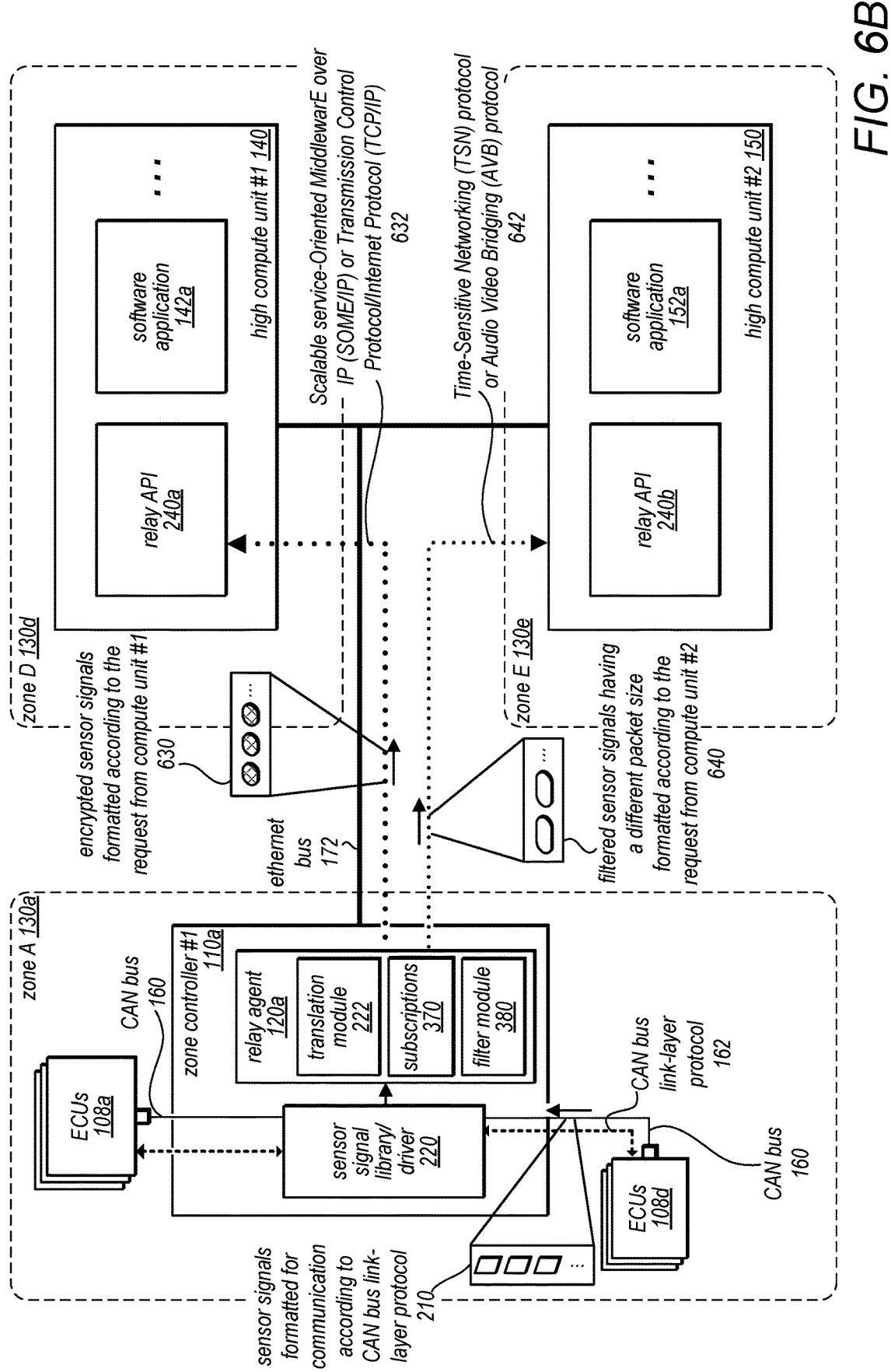
FIG. 6B illustrates a more detailed view a relay agent of a vehicle signal relay system that sends sensor signals translated from a CAN bus link-layer protocol to a format that can be communicated using an ethernet bus link-layer protocol, wherein the translated sensor signals are encrypted and/or re-formatted into a different packet size, wherein the encrypted and/or re-formatted packets are sent using either a best-effort transmission protocol or a deterministic protocol based on respective quality-of-service requirements for the subscribed sensor signals, according to some embodiments.

FIG. 6B illustrates a more detailed view a relay agent of a vehicle signal relay system that sends sensor signals translated from a CAN bus link-layer protocol to a format for communication using an ethernet bus link-layer protocol that are encrypted and/or formatted into a different packet size and conforms either to a best-effort transmission protocol or a deterministic protocol based on respective quality-of-service requirements, according to some embodiments.

In some embodiments, an encrypted sensor signal formatted according to requests from compute unit #1 630 may be sent over the ethernet bus 172 according to a best-effort protocol. For example, the encrypted sensor signal 630 may be sent using a best-effort transmission protocol such as service-Oriented MiddlewarE over IP (SOME/IP) or Transmission Control Protocol/Internet Protocol (TCP/IP) 632 based on the quality-of-service requirement of the request 602 which indicates that the sensor signals are to be sent using the best-effort transmission protocol. Moreover, the encrypted sensor signal 630 may be encrypted based on the quality-of-service requirement of the request 602 which indicates that the sensor signals are to be encrypted. In some embodiments, a quality-of-service requirement of the request 602 may indicate that upon receipt of a token signed by an authority having a valid root of trust for the zone controller #1 110a that verifies the identity of the zone controller #1 110a as a legitimate entity, the relay agent 120a is to encrypt and send the encrypted sensor signals 630. In some embodiments, the encrypted sensor signals 630 may be sent without receiving a cryptographic token/valid cryptographic token from the software application 142a based on receipt of the token signed by the authority having the valid root of trust.

In some embodiments, a filtered sensor signal having a different packet size is formatted according to the request from compute unit #2 640 and may be sent over the ethernet bus 172 using a deterministic protocol. For example, the filtered sensor signal 640 having a different packet size may be sent using a Time Sensitive Network (TSN) protocol or Audio Video Bridging (AVB) protocol based on the quality-of-service requirement of the request 604 that indicates that the sensor signals are to be sent using the deterministic transmission protocol. In some embodiments, the filtered sensor signal 640 may be formatted to have a different packet size according to the quality-of-service requirement of the request 604 specifying the different packet size.

Figure 7:
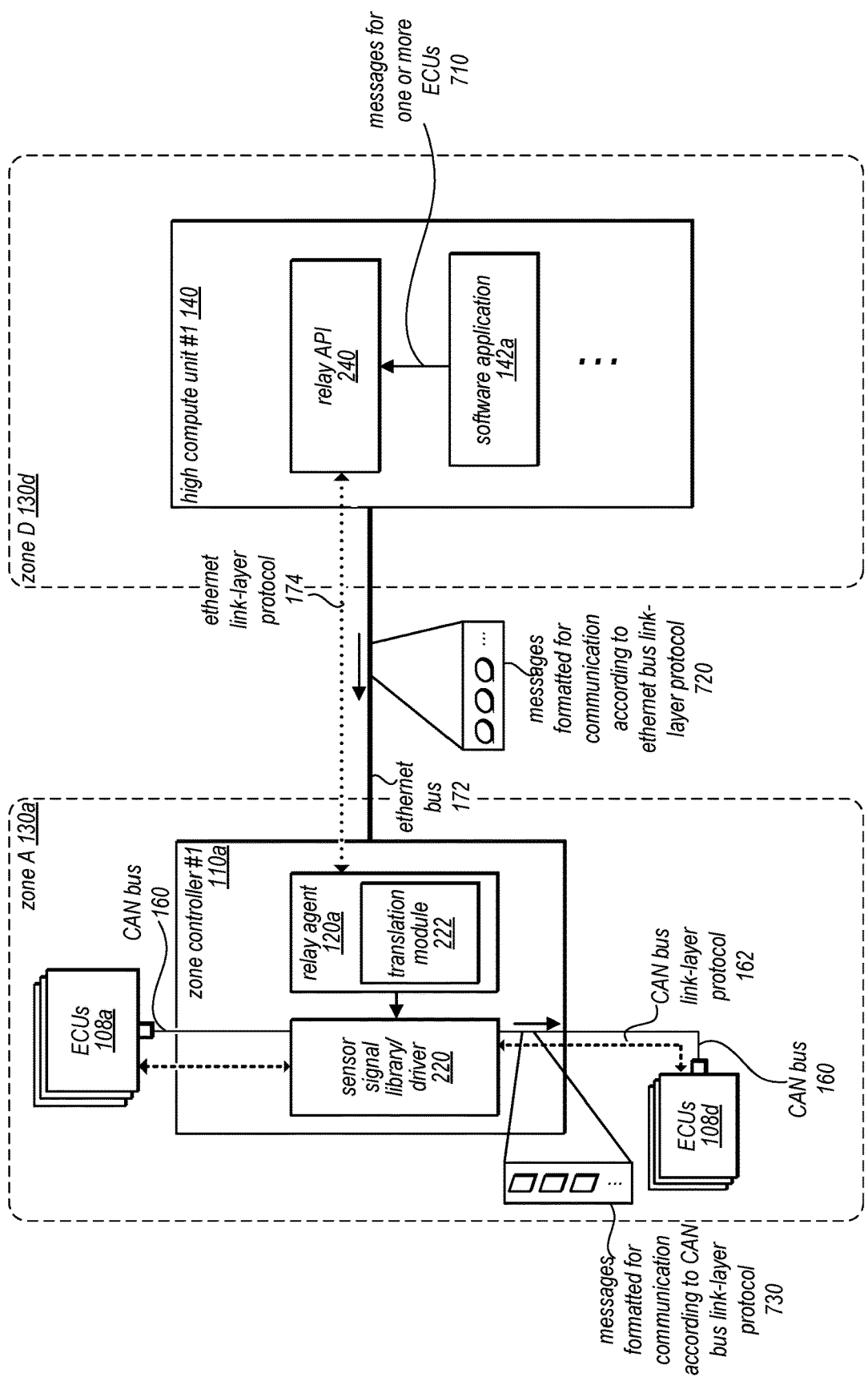
FIG. 7 illustrates a more detailed view of a relay agent of a vehicle signal relay system, its various parts, and interactions to translate messages received from a software application, wherein the messages received from the software application are formatted according to an ethernet bus link-layer protocol and converted for communications using a CAN bus link-layer protocol for further transmission on to ECUs in a local zone of the relay agent, according to some embodiments.

FIG. 7 illustrates a more detailed view of a relay agent of a vehicle signal relay system, its various parts, and interactions to translate messages received from a software application formatted according to an ethernet bus link-layer protocol to a format for communication using a CAN bus link-layer protocol and routing the translated messages to ECUs, according to some embodiments.

In some embodiments, the software application 142a may furthermore communicate to the ECUs 108d using the relay agent 128. For example, the software application 142A may send messages for one or more ECUs 710 to the relay API 240. The relay API 240 may be used to send messages formatted according to ethernet bus link-layer protocol 720 to the relay agent 120a. The relay agent 120a may utilize the translation module 222 to translate the messages formatted according to the ethernet bus link-layer protocol 720 into messages formatted for communication according to CAN bus link-layer protocol 730. In some embodiments, the communication arising from the software application 142a to the ECUs may be a two-way communication when communication exists both from the zone controller to the high compute unit (as described in FIGS. 2-6) along with communication from the high compute unit to the zone controller as described in FIG. 7. The two-way communication of sensor signal/messages may be sent over the ethernet bus 172 using a best-effort transmission protocol such as service-Oriented MiddlewarE over IP (SOME/IP) or Transmission Control Protocol/Internet Protocol (TCP/IP). In some embodiments, the two-way communication of sensor signal/messages may be sent over the ethernet bus 172 using a deterministic protocol, such as a Time Sensitive Network (TSN) protocol or Audio Video Bridging (AVB) protocol. The deterministic protocol may establish two different one-way connections (e.g., a first TSN protocol connection from the high compute unit #1 140 to the zone controller #1 110a and a second TSN protocol connection from the zone controller #1 110a to the high compute unit #1 140) to establish a two-way communication.

Figure 8:
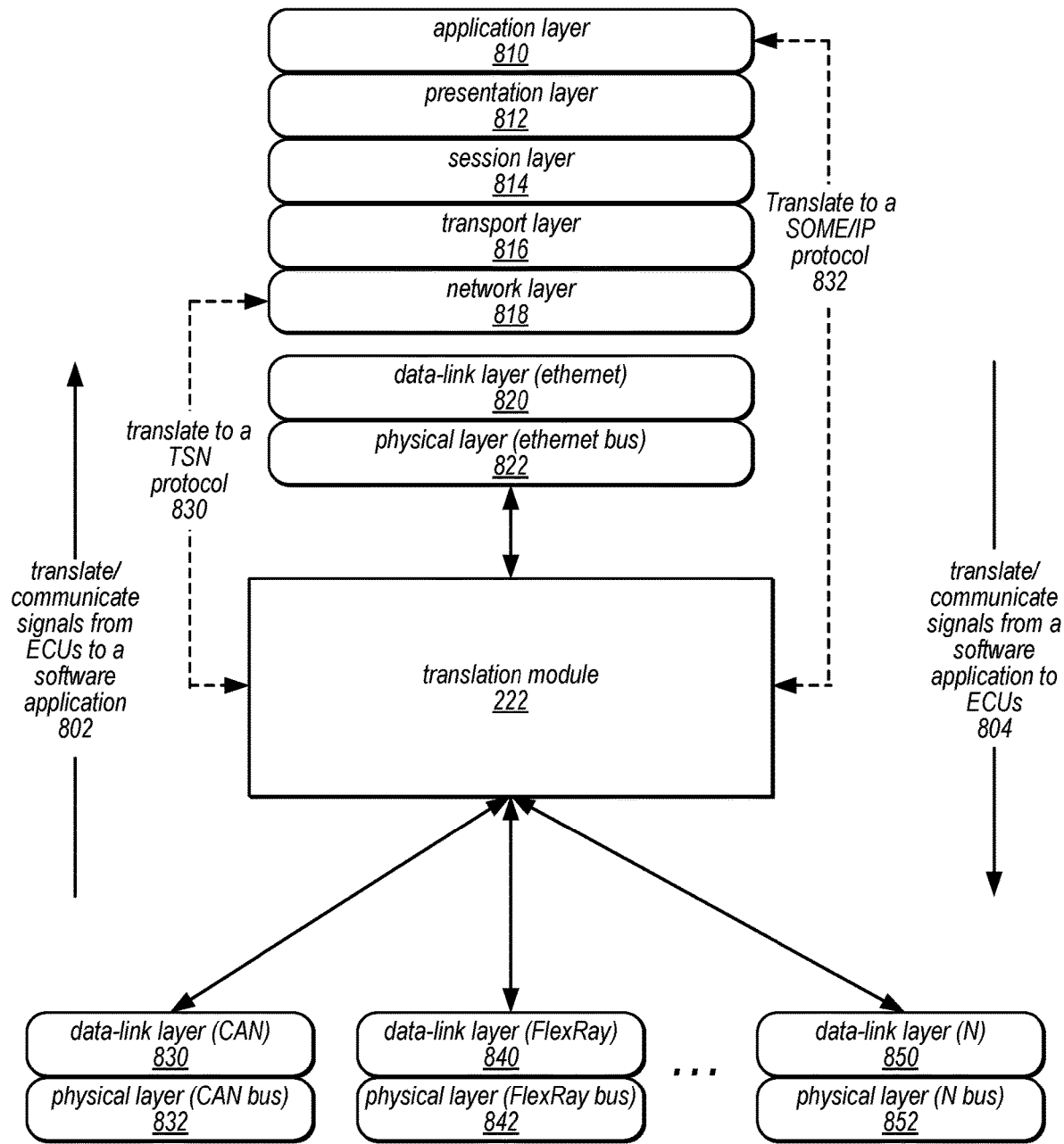
FIG. 8 illustrates a graphical view of a translation module of a relay agent of a vehicle signal relay system that translates sensor signals into various formats for communication using different data link-layer/physical layer communication protocols of respective ECUs and respective software applications, according to some embodiments.

FIG. 8 illustrates a graphical view of a translation module of a relay agent of a vehicle signal relay system that translates sensor signals into formats for communication using various different data link-layer/physical layer communication protocols of respective ECUs and respective software applications, according to some embodiments.

In some embodiments, the translation module 222 may translate signals formatted according to differing data link-layer and physical layer communication protocols from ECUs to a software application 802 as well as from the software application to ECUs 804. In some embodiments, a protocol may define the format and the order of messages exchanged between two or more communicating entities, as well as the actions taken on the transmission and/or receipt of a message or other event. The communication protocols that are translated by the translation module 222 may comprise multiple protocol layers in a protocol stack. For example, the protocol stack of an incoming signal may comprise an application layer 810, a presentation layer 812, session layer 814, a transport layer 816, a network layer 818, a data link-layer (ethernet) 820, and a physical layer (ethernet bus) 822. A protocol layer may be implemented in software, in hardware, or in a combination of the two. Although, FIG. 8 illustrates a protocol stack having seven layers according to International Organization for Standardization (ISO) Open System Interconnection (OSI) model, the sensor signals/messages that are translated by the translation module 222 are not limited to the ISO OSI model and may include other protocol stacks, such as a five-layer protocol stack or other suitable protocol stack used in automotive contexts.

In some embodiments, the translation module 222 may translate the physical layer (ethernet bus) 822 and data link-layer (ethernet) 820 protocols that are responsible for handling communication over a specific (ethernet) bus. For example, the translation module 222 may translate a data link-layer (CAN) 830 protocol and physical layer (CAN bus protocol) 832 into a data link-layer (ethernet) 820 protocol and a physical layer (ethernet bus) 822 protocol and vice versa. Note that in some embodiments, such translation may involve translating the actual sensor signals into a format understandable by an application that is to receive the translated sensor signals and may further involve routing the translated sensor signals onto an outgoing connection with the ethernet bus using an ethernet link-layer protocol. Similarly, the translation module 222 may translate a data link layer (FlexRay) 840 protocol and physical layer (FlexRay bus protocol) 832 into a format that can be communicated using the data link layer (ethernet) 820 protocol and the physical layer (ethernet bus) 822 protocol and vice versa. Although FIG. 8 identifies CAN and FlexRay bus protocols, the translation module 222 may translate to and from the data link-layer (ethernet) 820 protocol and the physical layer (ethernet bus) 822 protocol various other data link-layer (N) protocol 850 and physical layer (N bus) protocol 852 in addition to CAN and FlexRay bus protocols. Similarly, although FIG. 8 identifies ethernet bus protocol as the protocol to translate into in order to send to the software application, various other protocols conforming to the bus connecting a relay agent of a zone controller may be used. As mentioned above, translation of a first link-layer protocol to a second link-layer protocol may not be limited to direct translation at a link-layer level of a communication protocol stack, but may be at a different layer of the communication protocol stack built on top of the second link-layer protocol.

For example, the translation module 222 may obtain signals formatted according to the CAN bus data link layer 830 and CAN bus physical layer 832 and translate them to signals formatted for communication according to a TSN protocol 830 at the network layer 818 level. In another embodiment, the translation module 222 may obtain signals formatted according to the CAN bus data link layer 830 and CAN bus physical layer 832 and translate them to signals formatted for communication according to a SOME/IP protocol 832 at the application layer 810 level.

Figure 9:
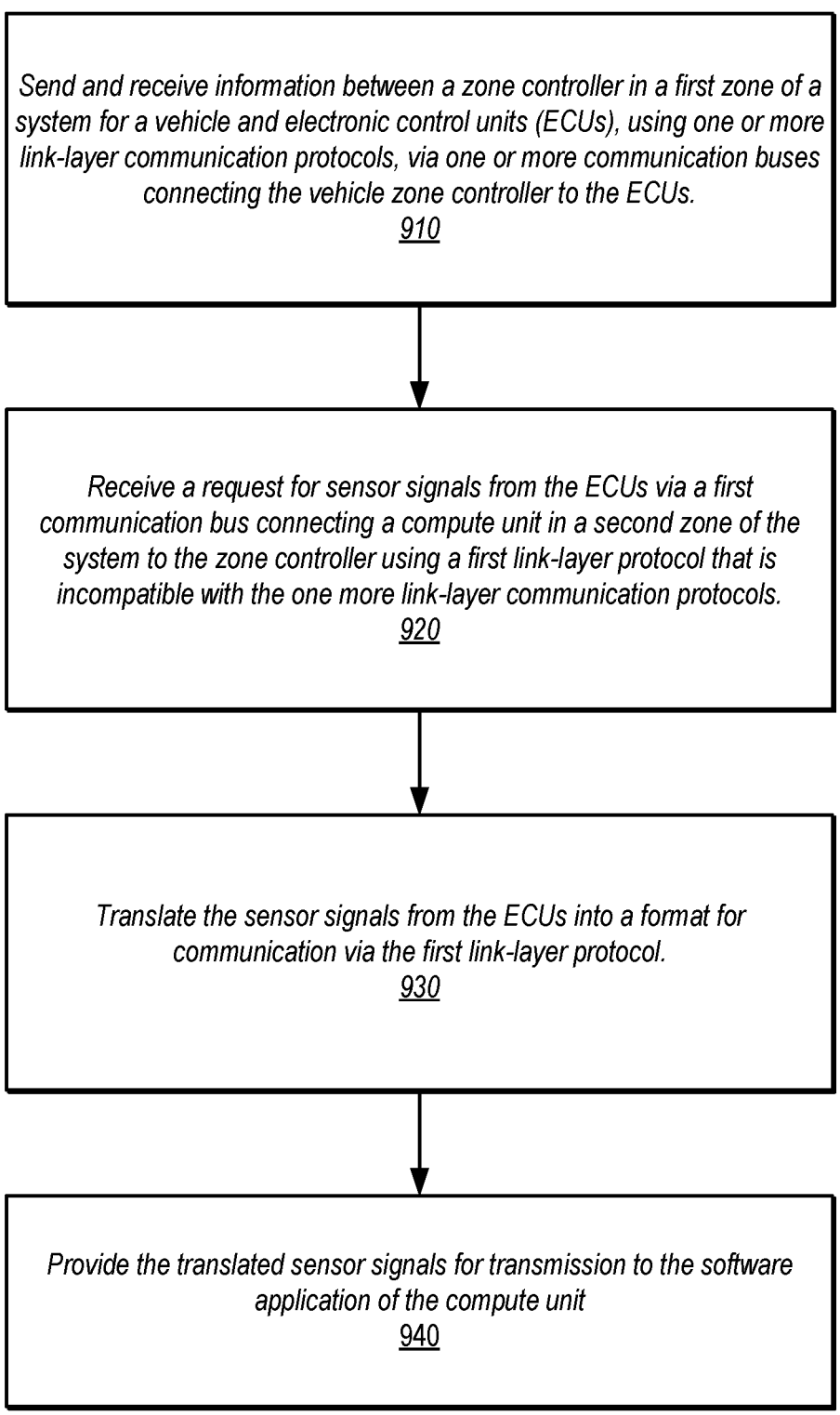
FIG. 9 illustrates a flowchart of operations performed by a relay agent of a vehicle signal relay system to translate signals formatted according to a CAN bus link-layer protocol to a format that can be communicated using an ethernet bus link-layer protocol and to provide for transmission the translated sensor signal to a software application in a different zone, according to some embodiments.

FIG. 9 illustrates a flowchart of operations performed by a relay agent of a vehicle signal relay system to translate signals formatted according to a CAN bus link-layer protocol to a format for communication using an ethernet bus link-layer protocol and to provide for transmission the translated sensor signals to a software application in a different zone, according to some embodiments.

At block 910, a relay agent of a vehicle relay system sends and receives information between a zone controller in a first zone of a system for a vehicle and electronic control units (ECUs), using one or more link-layer communication protocols, via one or more communication buses connecting the vehicle zone controller to the ECUs. In some embodiments, the one or more link-layer communication protocol between the zone controller in the first zone of the system for the vehicle and the ECUs may be one of a CAN bus protocol, a FlexRay bus protocol, or a LIN bus protocol as further discussed in FIGS. 1-2.

At block 920, a relay agent of a vehicle relay system receives a request for sensor signals from the ECUs via a first communication bus connecting a compute unit in a second zone of the system to the zone controller using a first link-layer protocol that is incompatible with the one more link-layer communication protocols. In some embodiments, as further discussed in FIGS. 2-3, the request for sensor signals may be sent to the relay agent using an ethernet bus protocol and the request may indicate specific ECU/sensor ID and/or type of sensor signals desired.

At block 930, the relay agent of a vehicle relay system translates the sensor signals from the ECUs into a format suitable for communication using the first link-layer protocol. As further discussed in FIG. 2 and FIG. 8, in some embodiments, a translation module of the relay agent may translate sensor signals formatted according to a CAN data link-layer protocol and CAN bus physical layer protocol into a format for communication using an ethernet data link-layer protocol and an ethernet physical layer protocol.

At block 940, the relay agent of a vehicle relay system provides the translated sensor signals for transmission to the software application of the compute unit. As discussed in FIG. 4, the relay agent may provide the translated sensor signals for transmission to multiple software applications in the same compute unit and/or multiple software applications in multiple compute units.

Figure 10:
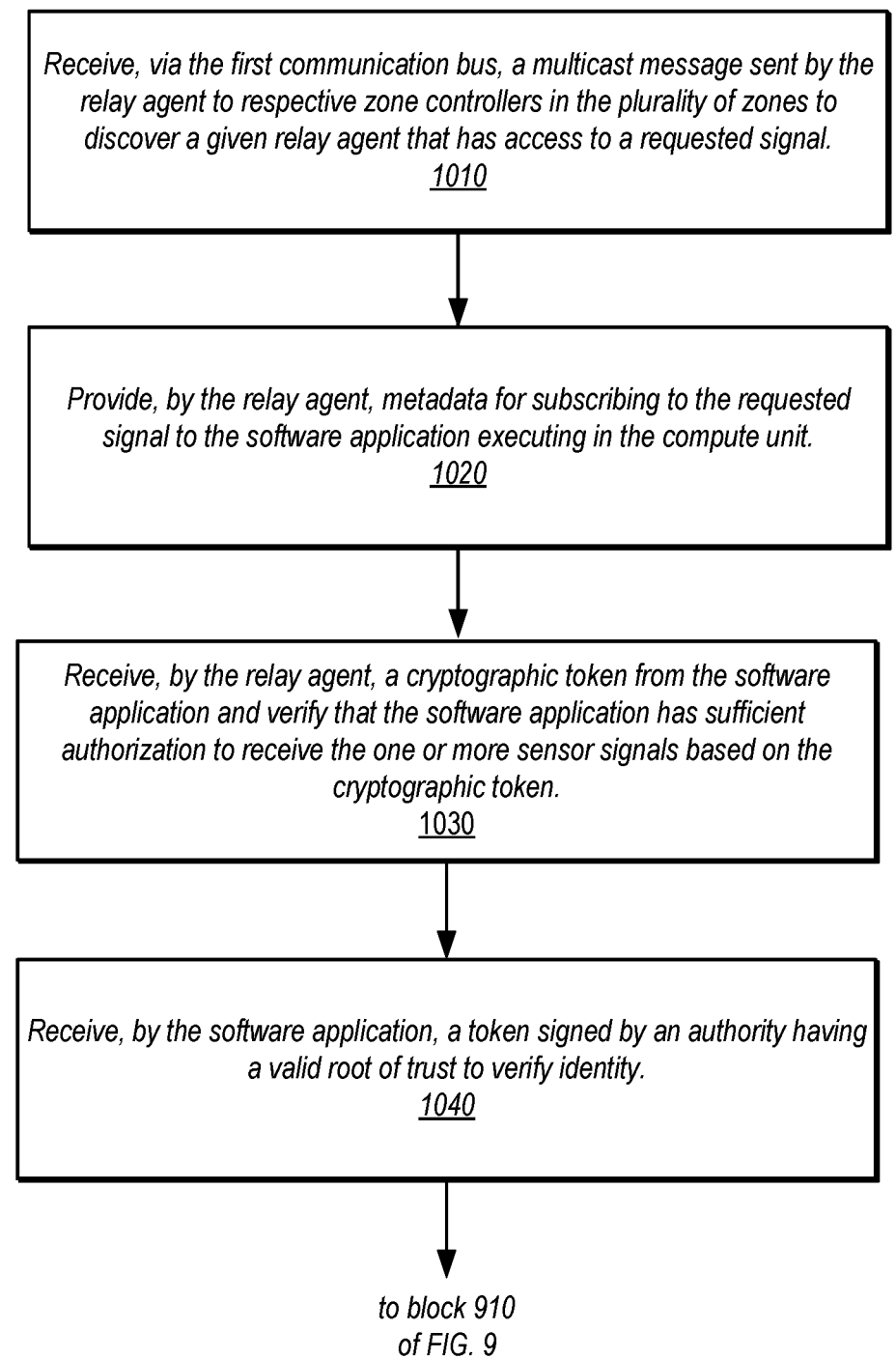
FIG. 10 illustrates a flowchart of operations performed by a relay agent of a vehicle signal relay system to receive a multicast message to discover a relay agent having access to a requested sensor signal and perform mutual attestation of the relay agent and the software application, according to some embodiments.

FIG. 10 illustrates a flowchart of operations performed by a relay agent of a vehicle signal relay system to receive a multicast message to discover the relay agent having access to a requested signal and perform mutual attestation of the relay agent and the software application to send translated sensor signals, according to some embodiments.

At block 1010, a relay agent of a vehicle relay system receives, via the first communication bus, a multicast message sent by the relay agent to respective zone controllers in the plurality of zones to discover a given relay agent that has access to a requested signal. As further discussed in FIG. 3A, the request for sensor signals may be for a specific type of signals and/or for a specific ECU(s) having a specific sensor ID(s), in some embodiments.

At block 1020, the relay agent of the vehicle relay system provides, by the relay agent, metadata for subscribing to the requested signal to the software application executing in the compute unit. In some embodiments, the relay agent may provide the metadata comprising one or more information identifying the location of the zone controller, such as an IP address of the zone controller of the relay agent as further discussed in FIG. 3A.

At block 1030, the relay agent of the vehicle relay system receives, by the relay agent, a cryptographic token from the software application and verifies that the software application has sufficient authorization to receive the one or more sensor signals based on the cryptographic token. In some embodiments, as further discussed in FIG. 3B, one or more keys and certificates stored in a secure location within requested ECUs may be used to verify that the cryptographic token from the software application is a valid token.

At block 1040, the software application receives, by the software application, a token signed by an authority having a valid root of trust for the zone controller and verifies the identity of the zone controller based on the received token. In some embodiments, the relay agent may encrypt the sensor signals to be sent based on the token signed by the authority having the valid root of trust for the zone controller as further discussed in FIG. 6B.

Example Computer System

Figure 11:
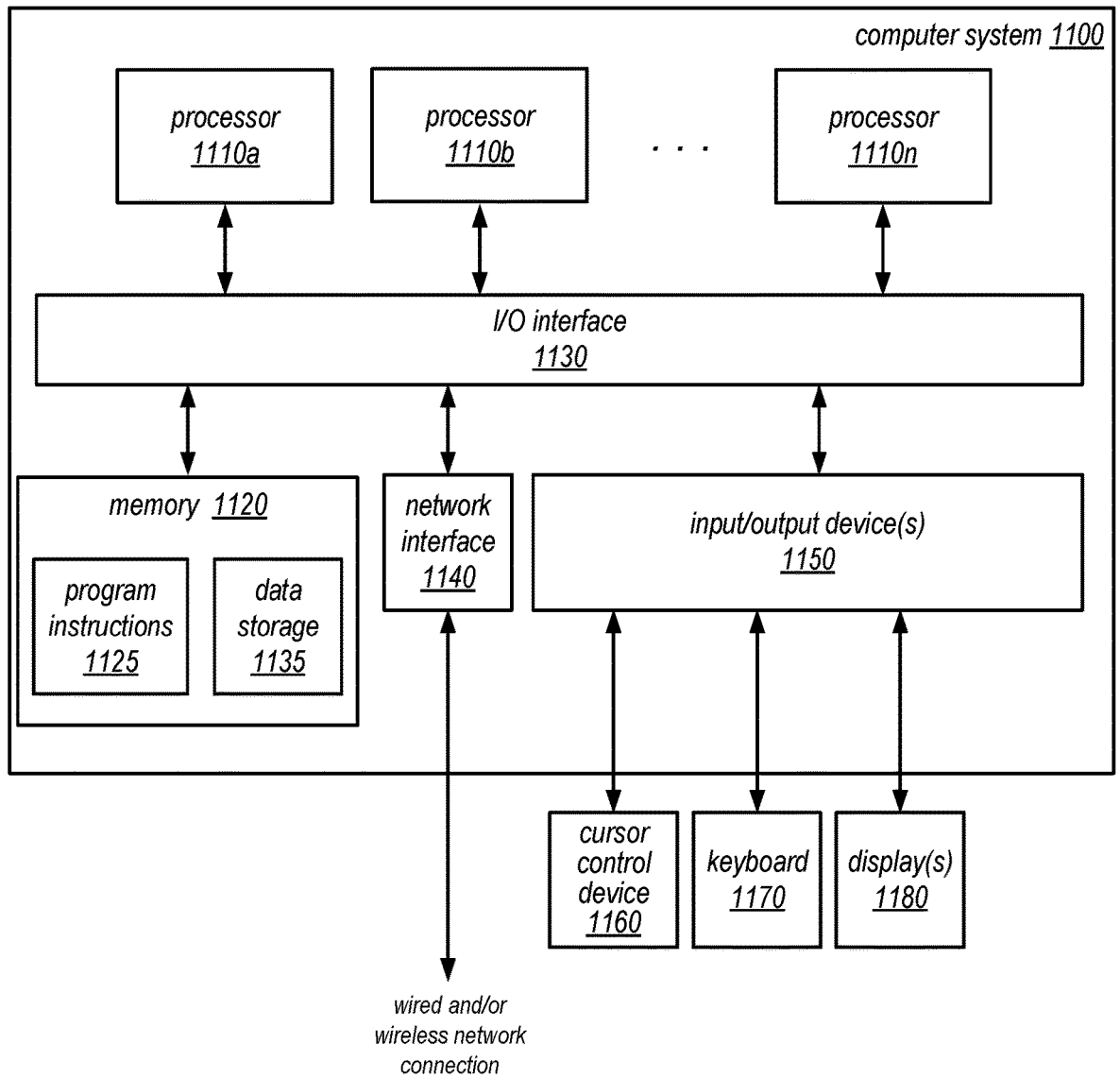
FIG. 11 illustrates a block diagram illustrating an example computer system that implements some or all of the techniques described herein, according to some embodiments.

Any of various computer systems may be configured to implement processes associated with a vehicle signal relay system, in-vehicle application deployment planner/orchestrator, an operating system in a vehicle or device, or any other component of the above figures. For example, FIG. 11 illustrates a block diagram illustrating an example computer system that implements some or all of the techniques described herein, according to some embodiments. In various embodiments, the vehicle signal relay system, the provider network that is used to deploy the vehicle signal relay system and other cloud services, the operating system in a vehicle or device, or any other component of the above figures FIGS. 1-10 may each include one or more computer systems 1100 such as that illustrated in FIG. 11.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or that provide a downloadable application, while in other embodiments servers may include more, fewer, or different elements than computer system 1100.

In various embodiments, computing device 1100 may be a uniprocessor system including one processor or a multiprocessor system including several processors 1110a-1110n (e.g., two, four, eight, or another suitable number). Processors 1110a-1110n may include any suitable processors capable of executing instructions. For example, in various embodiments, processors 1110a-1110n may be processors implementing any of a variety of instruction set formats (ISAs), such as the x86, PowerPC, SPARC, or MIPS ISAs, or any other suitable ISA. In some embodiments, processors 1110a-1110n may include specialized processors such as graphics processing units (GPUs), application specific integrated circuits (ASICs), etc. In multiprocessor systems, each of processors 1110*a*-1110*n* may commonly, but not necessarily, implement the same ISA.

System memory 1120 may be configured to store program instructions and data accessible by processor(s) 1110*a*-1110*n*. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code (e.g., program instructions) 1125 and data storage 1135.

In one embodiment, I/O interface 1130 may be configured to coordinate I/O traffic between processors 1110*a*-1110*n*, system memory 1120, and any peripheral devices in the device, including network interface 1140 or other peripheral interfaces. In some embodiments, I/O interface 1130 may perform any necessary protocol, timing, or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, I/O interface 1130 may include support for devices attached via an automotive CAN bus, etc. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processors 1110*a*-1110*n*.

In some embodiments, the network interface 1140 may be coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such computer systems, or multiple nodes making up computer system 1100, may be configured to host different portions or instances program instructions as described above for various embodiments. For example, in one embodiment some elements of the program instructions may be implemented via one or more nodes of computer system 1100 that are distinct from those nodes implementing other elements.

Network interface 1140 may be configured to allow data to be exchanged between computing device 1100 and other devices associated with a network or networks. In various embodiments, network interface 1140 may support communication via any suitable wired or wireless general data networks, such as types of ethernet networks, cellular networks, Bluetooth networks, Wi-Fi networks, Ultra-wideband Networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 1100 via I/O interface 1130. One or more non-transitory computer-readable storage media may also include any volatile or non-volatile media such as RAM (e.g., SDRAM, DDR SDRAM, RDRAM, SRAM, etc.), ROM, etc., that may be included in some embodiments, of computing device 1100 as system memory 1120 or another type of memory. Further, a computer-readable medium may include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or nonvolatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The invention claimed is:

1. A system for a vehicle, comprising:
a plurality of computing devices configured to implement a plurality of vehicle zone controllers in a plurality of zones of the vehicle, wherein the vehicle zone controllers respectively comprise respective relay agents, and wherein respective ones of the vehicle zone controllers are configured to send and receive information, using one or more link-layer communication protocols, to one or more electronic control units (ECUs) in a respective one of the plurality of zones via one or more communication buses connecting the respective vehicle zone controllers to the one or more ECUs;

a compute unit, wherein the compute unit is connected to the respective vehicle zone controllers via an ethernet bus using an ethernet link-layer protocol, and wherein the one or more link-layer communication protocols are incompatible with the ethernet link-layer protocol;

wherein the compute unit is configured to:
  send a multicast message to the respective zone controllers in the plurality of zones, using the ethernet link-layer protocol, in response to a request from a software application for one or more sensor signals from the one or more ECUs, to discover a given relay agent of a given vehicle zone controller configured to send and receive information to the one or more ECUs using the one or more link-layer communication protocols, wherein the request from the software application is received at an application programming interface (API) implemented at the compute unit, and wherein the given vehicle controller is in a first zone of the plurality of zones and the compute unit is in a second zone of the plurality of zones;

wherein the given relay agent of the given vehicle zone controller in the first zone is configured to:
  provide a discovery response, based on the multicast message, wherein the discovery response indicates that the given relay agent has access to the requested one or more sensor signals;
  receive, based on discovery of the given relay agent, the request sent via the ethernet bus, wherein the request is for the one or more sensor signals from the one or more ECUs;
  translate the one or more sensor signals from the one or more ECUs into a format compatible with the ethernet link-layer protocol; and
  provide the one or more translated sensor signals for transmission to the software application in the compute unit.

2. The system of claim 1, wherein:
the request for the one or more sensor signals is a subscription request indicating at least one sensor signal of the one or more sensor signals to be subscribed to, and
in response to receiving the subscription request, the relay agent is configured to provide the at least one sensor signal indicated in the subscription request to the compute unit.

3. The system of claim 2, further comprising:
a second compute unit in a third zone of the plurality of zones, wherein the second compute unit is connected to the vehicle zone controller in the first zone; and
wherein the relay agent of the vehicle zone controller in the first zone is configured to:
  receive an additional subscription request indicating a second sensor signal of the one or more sensor signals to be subscribed to; and
  in response to receiving the additional subscription request, configure the relay agent to provide the second sensor signal indicated in the additional subscription request to the second compute unit.

4. The system of claim 1, wherein:
the relay agent of the vehicle zone controller in the first zone is configured to:
  receive, via the first communication bus, the multicast message; and
  provide metadata for subscribing to the requested one or more sensor signals to the software application executing in the compute unit.

5. A method, comprising:
receiving, using a first link-layer protocol, a multicast message sent from an application programming interface (API) based on a request by a software application executing in a compute unit for one or more sensor signals from one or more electronic control units (ECUs) in a given zone of a plurality of zones of a vehicle, wherein the multicast message is sent by the API to respective relay agents implemented in respective vehicle zone controllers in the plurality of zones of the vehicle to discover a given relay agent having access to the one or more sensor signals;

providing a discovery response, based on the received multicast message, the discovery response indicating a relay agent at a vehicle zone controller in a first zone of the plurality of zones has access to the requested one or more sensor signals;

receiving, based on discovery of the given relay agent, via a first communication bus, the request for the one or more sensor signals to be provided from the one or more ECUs, wherein the vehicle zone controller in the first zone is configured to send and receive information, using one or more link-layer communication protocols, to the one or more ECUs via one or more communication buses connecting the vehicle zone controller in the first zone to the one or more ECUs;

translating the one or more sensor signals from the one or more ECUs into a format compatible with the first link-layer protocol, wherein the compute unit is in a second zone of the plurality of zones and is connected to the respective vehicle zone controllers via the first communication bus using the first link-layer protocol, and wherein the one or more link-layer communication protocols are incompatible with the first link-layer protocol; and providing the one or more translated sensor signals for transmission to the software application of the compute unit.

6. The method of claim 5, wherein:
the request for the one or more sensor signals is a subscription request indicating at least one sensor signal of the one or more sensor signals to be subscribed to, and
in response to receiving the subscription request, configuring the relay agent to provide the at least one sensor signal indicated in the subscription request to the compute unit.

7. The method of claim 6, further comprising:
filtering by the relay agent, a given signal comprising a plurality of components such that at least one or more of the components are filtered from the given signal, wherein the one or more signals translated into the first link-layer protocol and provided to the software application comprise the given signal that has been filtered.

8. The method of claim 6, further comprising:
receiving by the relay agent, from a second compute unit in a third zone of the plurality of zones, an additional subscription request indicating a second sensor signal of the one or more sensor signals to be subscribed to; and
in response to receiving the additional subscription request, configuring the relay agent to provide the second sensor signal indicated in the additional subscription request to the second compute unit.

9. The method of claim 6, further comprising:

exchanging, one or more messages verifying application status, between the relay agent and one or more applications with a subscription for the at least one sensor signal with the relay agent;

configuring the relay agent to no longer provide the at least one sensor signal to a given one of the one or more applications upon a threshold time period having passed without having received a message verifying an application status of the given application.

10. The method of claim 5, further comprising:

providing, by the relay agent, metadata for subscribing to the requested one or more sensor signals to the software application executing in the compute unit.

11. The method of claim 10, further comprising:

receiving by the relay agent, a cryptographic token from the software application; and verifying that the software application has sufficient authorization to receive the one or more sensor signals based on the cryptographic token.

12. The method of claim 10, further comprising:

receiving by the software application, a token signed by an authority having a valid root of trust for the zone controller; and verifying the identity of the zone controller based on the indication of the root of trust.

13. The method of claim 12, further comprising:

encrypting the one or more translated sensor signals for transmission to be provided to the software application.

14. The method of claim 5, further comprising:

receiving, by the relay agent, one or more messages sent by the software application;

translating the one or more messages sent by the software application from the ethernet link-layer protocol to the one or more link-layer communication protocols; and providing the one or more translated messages to the one or more ECUs.

15. The method of claim 5, wherein translating the one or more sensor signals from the one or more ECUs into the format compatible with the first link-layer protocol comprises formatting the one or more sensor signals to conform to a different packet size based on packet size configuration of the first link-layer protocol.

16. One or more non-transitory, computer-readable storage media, storing program instructions that when executed on or across one or more computing devices cause the one or more computing devices to implement:

receiving, using a first link-layer protocol, a multicast message sent from an application programming interface (API) based on a request by a software application executing in a compute unit for one or more sensor signals from one or more electronic control units (ECUs) in a given zone of a plurality of zones of a vehicle, wherein the multicast message is sent by the API to respective relay agents implemented in respective vehicle zone controllers in the plurality of zones of the vehicle to discover a given relay agent having access to the one or more sensor signals;

providing a discovery response, based on the received multicast message, the discovery response indicating a relay agent at a vehicle zone controller in a first zone of the plurality of zones has access to the requested one or more sensor signals;

receiving, based on discovery of the given relay agent, via a first communication bus the request for the one or more sensor signals to be provided from the one or more ECUs, wherein the vehicle zone controller in the first zone is configured to send and receive information, using one or more link-layer communication protocols, to the one or more ECUs via one or more communication buses connecting the vehicle zone controller in the first zone to the one or more ECUs;

translating the one or more sensor signals from the one or more ECUs into a format compatible with the first link-layer protocol, wherein the compute unit is in a second zone of the plurality of zones and is connected to the respective vehicle zone controllers via the first communication bus using the first link-layer protocol, and wherein the one or more link-layer communication protocols are incompatible with the first link-layer protocol; and providing the one or more translated sensor signals for transmission to the software application of the compute unit.

17. The one or more non-transitory, computer-readable storage media of claim 16, wherein the one or more translated sensor signals for transmission to the software application is formatted based on a quality of service indicated in the request according to one or more of a best-effort communication protocol.

18. The one or more non-transitory, computer-readable storage media of claim 17, wherein the one or more of the best-effort communication protocol comprises one or more of a Scalable service-Oriented MiddlewarE over IP (SOME/IP), a Transmission Control Protocol/Internet Protocol (TCP/IP), or a Data Distribution Service (DDS).

19. The one or more non-transitory, computer-readable storage media of claim 16, wherein the one or more translated sensor signals for transmission to the software application is formatted based on a quality of service indicated in the request according to one or more of a deterministic communication protocol.

20. The one or more non-transitory, computer-readable storage media of claim 19, wherein the one or more of the deterministic communication protocol comprises one or more of a Time-Sensitive Networking (TSN) protocol or an Audio Video Bridging (AVB) protocol.

* * * * *